US007018539B2

(12) United States Patent
Mairal et al.

(10) Patent No.: US 7,018,539 B2
(45) Date of Patent: Mar. 28, 2006

(54) TREATMENT OF SHIPBOARD-GENERATED OILY WASTEWATERS

(75) Inventors: Anurag P. Mairal, Fremont, CA (US); Alvin Ng, Palo Alto, CA (US); Johannes G. Wijmans, Menlo Park, CA (US); Ingo Pinnau, Palo Alto, CA (US); Jennifer H. Ly, San Jose, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 186 days.

(21) Appl. No.: 10/279,718

(22) Filed: Oct. 24, 2002

(65) Prior Publication Data

US 2004/0079706 A1 Apr. 29, 2004

(51) Int. Cl.
*B01D 61/00* (2006.01)
*C02F 1/38* (2006.01)

(52) U.S. Cl. ...................... 210/651; 210/652; 210/653; 210/781; 210/784; 210/787; 210/360.1; 210/369; 210/321.76; 210/321.85; 210/321.78; 210/321.79; 210/321.8; 210/321.87; 210/321.88; 210/321.89; 210/259

(58) Field of Classification Search ........ 210/651–655, 210/781, 784, 787, 360.1, 369, 321.6, 641, 210/259, 321.76, 321.85, 321.78, 321.79, 210/321.8, 321.87, 321.88, 321.89, 500.23
See application file for complete search history.

(56) References Cited

U.S. PATENT DOCUMENTS

| | | | | |
|---|---|---|---|---|
| 4,748,288 A | | 5/1988 | Bitter et al. | 585/818 |
| 4,915,844 A | | 4/1990 | Imamura et al. | 210/651 |
| 4,963,165 A | | 10/1990 | Blume et al. | 55/16 |
| 4,978,454 A | | 12/1990 | Sweet | 210/640 |
| 5,087,370 A | | 2/1992 | Schultheis et al. | 210/638 |
| 5,108,549 A | * | 4/1992 | Wenzlaff et al. | 203/1 |
| 5,133,870 A | * | 7/1992 | Heidenreich | 210/667 |
| 5,221,480 A | | 6/1993 | Schultheis et al. | 210/638 |
| 5,265,734 A | | 11/1993 | Linder et al. | 210/654 |
| 5,482,634 A | | 1/1996 | Goerlach-Doht et al. | 210/651 |
| 5,501,741 A | | 3/1996 | McMahon | 134/13 |
| 5,527,974 A | | 6/1996 | Jeromin et al. | 568/869 |
| 5,932,091 A | | 8/1999 | Tompkins et al. | 210/97 |
| 6,187,197 B1 | | 2/2001 | Haddock | 210/641 |

FOREIGN PATENT DOCUMENTS

| | | | |
|---|---|---|---|
| DE | 4237604 | 5/1994 | 61/14 |
| GB | 1456304 | 11/1976 | 61/14 |

OTHER PUBLICATIONS

Nunes et al., "Dense hydrophilic composite membranes for ultrafiltration," Journ. Membrane Sci., 106, p. 49-56 (1995).
Ebert et al., "Solvent resistant nanofiltration membranes in edible oil processing," Membrane Technology, 107, p. 5-8.

* cited by examiner

*Primary Examiner*—W. L. Walker
*Assistant Examiner*—Krishnan S. Menon

(57) ABSTRACT

A process and apparatus for treating oily wastewater, such as bilge water or ballast water, generated on a ship. The process uses a combination of a centrifugal separation step and a membrane separation step, such as an ultrafiltration step. The membrane separation step uses a dense, non-porous filtration membrane. The process is able to remove both emulsified oil and dissolved oil from the wastewater to low levels.

37 Claims, 12 Drawing Sheets

TREATMENT OF SHIPBOARD-GENERATED OILY WASTEWATERS

This invention was made in part with Government support under SBIR award number 68-D-01-030, awarded by the Environmental Protection Agency. The Government has certain rights in this invention.

FIELD OF THE INVENTION

The invention is a process for treating shipboard-generated oily wastewater or the like. The process uses a centrifugal separation step and a membrane separation step in combination.

BACKGROUND OF THE INVENTION

Naval and commercial vessels generate large volumes of oily wastewater, mostly in the form of bilge water and ballast water. Bilge water typically contains various oils and fuels, grease, antifreeze, hydraulic fluids, cleaning and degreasing solvents, detergents, rags, and metals (including arsenic, copper, cadmium, chromium, lead, nickel, silver, mercury, selenium, and zinc) that collect during the daily operation of a vessel. Bilge water may also contain "gray water," which includes galley water; turbid water from showers and laundry; and drainage water from air conditioning units, drinking fountains, and deck drains. Ballast water may be contaminated with oil that was transported in the ship prior to ballasting, or may contain small animal and vegetable sea life drawn in with the ballast water.

Other smaller sources of oily wastewater generated onboard ships include steam condensate, boiler blowdown, elevator pit effluent, deck runoff, gas turbine wash water, motor gasoline compensating discharge, and aqueous wastes from other diverse types of machinery and machine operations.

In the past, these oily wastewaters were either stored for subsequent onshore treatment or simply discharged overboard. More recently, regulating bodies such as MARPOL, the EPA, the U.S. Coast Guard, the Department of Defense, and some states have enacted more stringent restrictions on the location and extent of such discharges. These new regulations require oily wastewater to be treated to 15 ppm or less oil content prior to overboard discharge. Some regions have yet more stringent requirements. For example, Canadian regulations in the Great Lakes limit oil content of discharged waters to 5 ppm. Uniform National Discharge Standards (UNDS) for vessels of the armed forces, now being developed in the United States under a three-phase program, may require numerous possible discharge streams to be controlled, and may be expanded to include additional pollutants, such as metals, as well as to civilian shipping.

The current state of the art is to hold wastewater in a storage tank for the duration of the voyage (and to treat it later onshore), or to use oil/water separators (OWS), usually of the parallel-plate type, to treat water on the ship. OWS systems are gravity separators that separate based on the different densities of oil and water phases. Under appropriate conditions, such separators can provide reasonably good separation of discrete oil and water phases. They are ineffective, however, in removing colloidal particles, emulsified oil or dissolved oil. Since oil in these forms is usually present at least at the hundreds of ppm level, oil/water separators are unable in meet the 15 ppm limit in most cases.

Both storage and simple gravity separation obviously have many drawbacks, and a clear need for better treatment techniques exists.

The U.S. Navy has installed separation systems using ceramic ultrafiltration membranes on a few vessels. When clean, the membrane systems have sufficient separation capability to meet the 15 ppm oil in wastewater discharge requirement. However, they are very susceptible to internal fouling (plugging of pores by oil or other contaminants) and surface fouling (build-up of an oil layer on the surface of the membrane). As a result, the membranes must be taken off-line and back-flushed or otherwise cleaned every day. Cleaning gradually becomes less effective, and the trans-membrane water flux may decline to a level at which more water is being generated than can be treated.

Thus, better solutions to the water treatment problems of ship operators are urgently needed.

Combinations of unit separation steps, such as various forms of phase separation and membranes, as a general form of treatment for aqueous effluents of all kinds, are known in the prior art. For example, U.S. Pat. No. 4,915,844, to Nitto Denko, describes a combination of ultrafiltration membrane separation followed by centrifugal separation, or alternatively, ultrafiltration and centrifugation steps independent of each other, for recovering silica particles from process wastewater. U.S. Pat. No. 5,482,634, to Dow Chemical, describes the separation of cellulose ethers from water with a combination of centrifugation and ultrafiltration using glassy polymer membranes. U.S. Pat. Nos. 5,087,370 and 5,221,480, both to Clean Harbors, describe removal of toxic metals and organics from water by a combination centrifuge/membrane process, using a porous microfiltration or ultrafiltration membrane.

Phase separation combined with ultrafiltration has been described for treatment of diverse oily wastewater streams. U.S. Pat. No. 5,527,974, to Henkel Kommanditgesellschaft, describes separating natural fats and oils from glycerol water by a combination phase separation and microfiltration process. This patent also includes discussion of the need for periodic back-flushing of the membrane to reduce fouling. U.S. Pat. No. 5,501,741, to USS-POSCO, describes separating fats or fatty acids from water using either ultrafiltration membrane separation or centrifugation, followed by a microfiltration membrane step. British Patent GB1456304, to Abcor, describes separation of oil-water mixtures by a combination of ultrafiltration/centrifugation using a porous cellulose acetate membrane. U.S. Pat. No. 6,187,197, to Haddock, describes the use of a combination hydrocyclone/nanofiltration process. The process is described as a pretreatment for the standard reverse osmosis treatment used to separate oils, fuels, and dissolved solids from ethylene glycol/water engine coolant.

Other patents that disclose the combination of gravity separation and membrane filtration include U.S. Pat. No. 4,978,454, to Exxon, which describes a system using a gravity settler to recover a light phase and a heavy phase from a three-phase mixture, and a membrane to separate the intermediate phase. U.S. Pat. No. 5,108,549, to GKSS, describes a decanter/pervaporation process for separating organics from water.

Finally, U.S. Pat. No. 5,932,091, to the U.S. Secretary of the Navy, describes separating oily bilge water with a ceramic ultrafiltration membrane, which is backflushed after each wastewater treatment cycle to reverse the effects of fouling.

All the ultrafiltration membranes cited above are porous and are subject to severe internal and surface fouling by oil and particulate matter in the wastewater stream. Internal fouling of the pores of the membrane is usually irreversible.

This type of fouling can be postponed by extensive pretreatment of the feed stream and repeated cleaning of the membrane. Over time, however, the pores of the membrane become permanently plugged, and the membrane must be replaced.

Surface fouling by deposition of solid material on the surface of the membrane can be reduced by high turbulence, regular cleaning, and using hydrophilic membrane materials to minimize adhesion to the membrane surface. Thus, any process using typical porous ultrafiltration membranes must endure periodic shutdowns while the membrane elements are taken off-line for treatment with appropriate cleaning solutions. However, such shutdowns are inconvenient, disruptive, and costly, and the cleaning procedures may be difficult to apply and only partially effective. Further, the spent cleaning solutions create yet another waste stream requiring treatment. Thus, such cleaning techniques are inappropriate for shipboard use. In addition, the composition of shipboard bilge and ballast waters can vary widely during a day of ship's operation, and the membranes may be suddenly subjected to a broad range of highly-fouling oil-water emulsions, solvents, surfactants and particulates, causing erratic or unpredictable membrane performance.

Attempts to use dense, nonporous membranes as reverse osmosis or ultrafiltration membranes have been reported in the literature. U.S. Pat. No. 5,265,734, to Kiryat Weitzman, describes a process for separating organic mixtures using an ethylenically unsaturated nitrile membrane coated with silicone to create a nonporous layer. This membrane is reported to be solvent resistant and to swell only minimally in the presence of organic solvents. U.S. Pat. No. 4,748,288, to Shell Oil, describes the use of a dense halogen-substituted silicone membrane to separate dissolved hydrocarbons from solvents. This membrane, also, is reported to be solvent stable and minimally swelling.

Such dense, nonporous membranes have been reported to be fouling resistant. An article by K. Ebert et al., "Solvent resistant nanofiltration membranes in edible oil processing," (*Membrane Technology*, No. 107, p. 5–8), compares the performance of polyether-polyamide block copolymer membranes and cellulose-type membranes for separation of edible oils from solvents. An article by S. Nunes et al., "Dense hydrophilic composite membranes for ultrafiltration," (*J. Membrane Science, Vol.* 106, p. 49–56, 1995), compares the separation performance and fouling resistance of polyether-polyamide block copolymer membranes and cellulose membranes for separating oil-water emulsions from the metal working industry. German Patent DE4237604, to GKSS, discloses the uses of polyether-polyamide block copolymer membranes or epichlorohydrin-ethylene oxide copolymer membranes for ultrafiltration applications, and notes their low tendency to fouling.

It is an object of the present invention to provide a membrane-based process for separation of oils from bilge, ballast, and other oily wastewaters generated in connection with naval and commercial shipping activities.

Additional objects and advantages of the invention will be apparent from the description below to those of ordinary skill in the art.

SUMMARY OF THE INVENTION

The invention is a process for separating oils from oily wastewater. The invention is particularly useful for treating oily bilge, ballast, or other wastewater generated onboard commercial and naval vessels. The separation is accomplished by the combination of a centrifugal separation step and a membrane separation step. The goal is to produce a treated water stream, preferably suitable for discharge, and to reduce the volume of the waste stream which must be subsequently treated, either onboard ship or onshore.

The centrifugal separation step uses a centrifugal separator, usually a centrifuge but optionally a hydrocyclone, that can separate the solids, free-phase oil, and most of the unstable emulsified oil from the oily wastewater. The light-phase, oily waste stream, containing the small volume of concentrated oil/solids, may be stored for subsequent onshore disposal. Alternatively, the concentrated waste may be subjected to additional treatment, either onboard ship or onshore, to further reduce the volume of the waste, to convert the oil to a non-hazardous waste suitable for discharge either overboard or onshore, or to degrade the oil completely. Such treatment may include, but is not limited to, membrane or other separation processes, bioreaction, oxidation, combustion with or without energy recovery, or thermal treatment.

The heavy-phase water stream from the centrifugal separator, with the oil level reduced typically to less than about 500 ppm, preferably to about 100 ppm, is subjected to a membrane filtration step, preferably, but not necessarily an ultrafiltration step. The membrane filtration step uses a dense, nonporous and substantially continuous and defect-free membrane that is resistant to fouling or damage by oil and other contaminants in the water stream. The membrane is a composite membrane, consisting of a microporous support overcoated with a nonporous, hydrophilic polymer layer, which performs the separation by permeating water and rejecting oil.

The preferred polymer for the dense, oil-rejecting layer is a polyamide-polyether block copolymer, commercially available as Pebax® and described in detail in U.S. Pat. No. 4,963,165, which is incorporated herein by reference in its entirety. Because the membrane surface is nonporous, it is highly resistant to fouling by oils and particulates, yet still retains the high flux characteristics of a conventional porous ultrafiltration membrane. In addition to rejecting oils, the preferred membrane also rejects various other hydrocarbons and organic compounds, and is not damaged or fouled by prolonged exposure to these components.

The permeate water stream from the membrane separation step typically contains less than about 50 ppm oil, preferably less than about 20 ppm oil, more preferably less than about 10 ppm oil, and most preferably no more than about 1 ppm oil. At these lower levels, the water may be safely discharged, if desired. Alternatively, the treated water stream may be subjected to further treatment, or sent to any other convenient destination.

The oil-enriched residue stream from the membrane separation step may be recirculated in whole or part to the centrifugal separation step or to the membrane separation step for further removal of oil, or otherwise handled as discussed in more detail below.

The process as a whole and the individual unit operations within the process may be carried out according to any convenient timetable (such as continuously, batchwise according to a regular schedule, or on demand) and in any convenient mode (such as single-pass, partial recirculation, or full recirculation), to integrate it as desired with the other operations of the ship.

Although it is preferred that each vessel be equipped with its own treatment unit, the process of the invention is also well suited to be used onshore to treat shipboard waste that has been stored and returned for treatment. Such onshore treatment is within the scope of the invention.

The process may also be used to treat other types of oily wastewaters, such as produced water and the like.

The invention in its most basic embodiment comprises:

(a) carrying out a centrifugal separation step, comprising:

(i) providing a centrifugal separator;

(ii) treating an oily wastewater in the centrifugal separator, thereby dividing the oily wastewater into a light oil-rich phase and a heavy oil-depleted phase;

(iii) withdrawing the light oil-rich phase as a concentrate stream;

(iv) withdrawing the heavy oil-depleted phase as a water stream;

(b) carrying out a membrane separation step, comprising:

(i) providing a membrane separation unit containing a membrane having a feed side and a permeate side, the membrane being characterized in that the feed side comprises a dense, non-porous membrane capable of permeating water and rejecting both emulsified oil and dissolved oil under ultrafiltration conditions;

(ii) passing the water stream across the feed side;

(iii) withdrawing from the feed side a residue stream enriched in oil compared to the water stream;

(iv) withdrawing from the permeate side a treated water permeate stream.

In another basic aspect, the invention is apparatus for carrying out an oily wastewater treatment process, and comprising the following elements:

a) a centrifugal separator, having a feed water inlet line, a light-phase outlet line and a heavy-phase outlet line; and (b) a first membrane separation unit, having a first membrane feed inlet line, a first residue outlet line, and a first permeate outlet line, and containing a first membrane having a first feed side and a first permeate side, the first membrane being characterized in that the first feed side comprises a first dense, non-porous membrane capable of permeating water and rejecting both emulsified oil and dissolved oil under ultrafiltration conditions;

and wherein the centrifugal separator heavy-phase outlet line and the first membrane feed inlet line are connected in such a way that oil-depleted water from the centrifugal separator may pass out of the centrifugal separator and into the membrane separation unit.

It is to be understood that the above summary and the following detailed description are intended to explain and illustrate the invention without restricting its scope.

BRIEF DESCRIPTION OF THE DRAWINGS

FIG. 9(*b*) is a graph of membrane permeate oil concentration over time for the long-term system test.

DETAILED DESCRIPTION OF THE INVENTION

Figure 1:
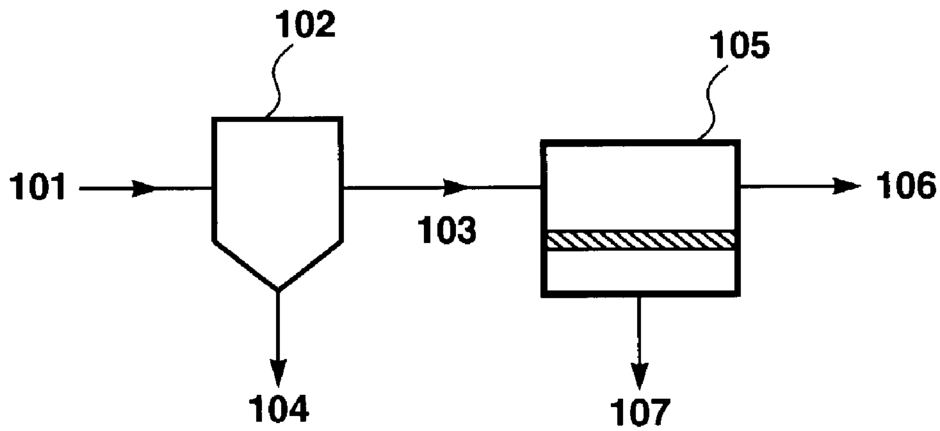
FIG. 1 is a schematic representation of the process of the invention in its most basic form.

All percentages cited herein are weight percent unless otherwise noted.

The invention is a process and apparatus for separating oils from oily wastewater. The invention is particularly useful for treating oily bilge, ballast, or other wastewater generated onboard commercial and naval vessels.

The separation process of the invention is accomplished by the combination of a centrifugal separation step and a membrane separation step. The goal is to produce a treated water stream of low oil content, preferably suitable for discharge, thereby reducing the volume of oily waste that must be further treated onboard the ship or stored onboard for subsequent onshore treatment or disposal.

In expressing the performance of the process in removing oil, especially in terms of rejection in the membrane separation steps, care must be taken in distinguishing the oil content and total organic carbon (TOC) content of streams.

One method of measuring the pollutant level of water is to use a TOC analyzer to obtain a TOC level. When a water sample is atomized into a combustion chamber, the total carbon dioxide produced on oxidation is measured. TOC levels measure all carbon sources in the sample, that is, suspended solid carbonaceous material, emulsified oil, and all dissolved carbon materials.

A second method of measuring the pollutant level of water is to measure the total oil and grease level by some form of solvent extraction test, such as EPA test method 1664A. In this procedure, a known volume of the water sample is extracted with a small amount of water-immiscible solvent. Emulsified oil and a portion of dissolved organics are extracted into the solvent and are subsequently analyzed. This technique measures the oily relatively hydrophobic and toxic organics dissolved in the water, but does not extract, and hence does not measure, more polar, less hydrophobic and less toxic organic components.

Especially when the TOC content is low, therefore, it is important for present purposes to distinguish between oil-and-grease components, which are the subject of many world-wide discharge regulations, and other components. Therefore, unless explicitly stated otherwise, when we refer to rejections or oil content in treated streams herein, we mean the oil-and-grease content as determined by EPA test method 1664A or equivalent.

The process of the invention in its most basic embodiment comprises:

(a) carrying out a centrifugal separation step, comprising:

(i) providing a centrifugal separator;

(ii) treating an oily wastewater in the centrifugal separator, thereby dividing the oily wastewater into a light oil-rich phase and a heavy oil-depleted phase;

(iii) withdrawing the light oil-rich phase as a concentrate stream;

(iv) withdrawing the heavy oil-depleted phase as a water stream;

(b) carrying out a membrane separation step, comprising:

(i) providing a membrane separation unit containing a membrane having a feed side and a permeate side, the membrane being characterized in that the feed side comprises a dense, non-porous membrane capable of permeating water and rejecting both emulsified oil and dissolved oil under ultrafiltration conditions;

(ii) passing the water stream across the feed side;

(iii) withdrawing from the feed side a residue stream enriched in oil compared to the water stream;

(iv) withdrawing from the permeate side a treated water permeate stream.

The invention in its most basic embodiment is illustrated in FIG. 1. It will be appreciated by those of skill in the art that this and the other figures described below are very simple schematic diagrams, intended to make clear the key aspects of the invention, and that an actual process train may include many additional components of a standard type, such as compressors, heaters, chillers, condensers, pumps, blowers, other types of separation and/or fractionation equipment, tanks, valves, switches, controllers, pressure-, temperature-, level-, flow- and concentration measuring devices and the like.

In particular, the figures in general do not explicitly show process control equipment or holding tanks. This is not to be construed to represent that the processes of the invention can be carried out only in continuous, once-through flow mode. It will be apparent to those of skill in the art that, like other water treatment processes, the processes of the invention are amenable to operation in a variety of continuous, intermittent and batch modes, without or with recirculation of process streams, with manual or automatic process control, and with or without intermediate holding tanks. All such operation modes are within the scope of the invention.

The considerations and criteria discussed below for FIG. 1 also apply in general to FIGS. 2, 3, 4 and 12.

Turning now to FIG. 1, stream 101 is oily wastewater, which has generally, but not necessarily, been pretreated by one or a series of gross filtration techniques to remove large particles. Any other pretreatment may also be used if desired. For example, an initial oil/water separation to remove quantities offree-phase oil may be carried out by means of one of more gravity settlers, such as a parallel-plate separator.

Stream 101 as it is passed into the process of the invention normally contains free-phase oil, emulsified oil and dissolved oil. The total oil content is generally higher than about 200 ppm oil, and may be as high as a few percent oil, or even up to as much as 10% oil or more, and in exceptional cases as much as 20% oil or more. As mentioned in the Background section above, it will also likely contain surfactants, dissolved volatile organic compounds (VOCs) and dissolved inorganic salts and metals.

It is not usually necessary to adjust the temperature of stream 101 before carrying out the process of the invention. Both centrifugal and membrane separation steps can be carried out satisfactorily over the normal range of temperatures at which bilge water and other shipboard wastewaters are encountered. Thus, preferred operating temperatures are in the range of about 5–75° C. The performance of the centrifugal separation step may improve slightly at the higher end of the temperature range, as may the water flux of the membrane step. Operation at temperatures below 5° C. tends to reduce the performance of both steps and is less desirable.

Stream 101, pretreated if desired, is passed to centrifugal separator 102. Centrifugal separators are known in the art, and are explained in detail in Ullman's Encyclopedia of Industrial Chemistry, Fifth Edition, Volume B2: Unit Operations I, Chapter 11 "Centrifuges and Hydrocyclones." The term centrifugal separator includes both centrifuges and hydrocyclones. Centrifuges are distinct from hydrocyclones. In a centrifuge, a rotating body causes the rotation of the aqueous medium, whereas in a hydrocyclone, a circumferential speed of an aqueous medium is generated by feeding it under pressure into the hydrocyclone. Either is usable in the process of the invention.

A great variety of centrifuge designs are known in the art, and are generally classified as: i) screen and filter centrifuges; ii) decanting and sedimentation centrifuges (solid bowl centrifuges); and iii) separators. Sub-categories of screen and filter centrifuges include, among others, pusher centrifuges, vibrating screen centrifuges, and scraper-type centrifuges. Sub-categories of separators include disk separators, tube separators, annular separators and centrifugal extractors. Any one of the above-mentioned types of centrifugal separators may be used in the process of the invention, subject to its meeting the criteria discussed below.

For the present invention, the centrifugal separator used in step 102 should meet a number of requirements, both structural and operational. As far as structural features are concerned, it should be of a robust design, able to operate without any special operator skills, or unusual power supply or other environmental requirements. It should be capable of running without an operator in attendance for considerable periods. The cleaning protocol should be simple, enabling the rotor to be cleansed of accumulated solids without dismantling the unit or disconnecting supply lines, and without needing extensive cleaning supplies or tools. The unit and all exposed components thereof should be resistant to oils, other hydrocarbons, including aromatic and chlorinated hydrocarbons, cleaning agents, and the like, as well as to salt corrosion.

As far as operational features are concerned, the unit must be reliable and energy efficient. In general, lower energy consumption means lower rpm and hence, lower G-forces generated by the equipment. Thus, the unit should be able to perform an adequate oil/water separation at relatively low G-force, typically no more than in the low thousands, such as 2,000 G and most preferably no more than about 1,000 G. For good reliability, the number of moving parts should be low, so that breakdowns are infrequent, and regular maintenance is simple and infrequent.

Another very important operational feature is turn-down capability, that is, the ability to handle variable flow rates and compositions. The wastewater to which the centrifugal separator is exposed may vary in oil content substantially from day to day or week to week, and spikes of high oil content, raising the oil content by orders of magnitude, may occur at any time. Likewise, the flow rate of water to the separator may fluctuate by a factor of 2, 5 or more over time.

The centrifugal separator should be able to accommodate such changes, preferably automatically.

In other words, the unit should have a high turn-down ratio, where turn-down ratio is defined as the ratio between the maximum design rate and the actual processing rate. That is, it should provide consistent removal of solids and free-phase oil, even at variable flow rates and variable oil loading. The unit must effectively handle spikes in oil concentration and deliver to the membrane unit a treated stream of constant oil concentration. Preferably, the separator should provide an automatic turn-down ratio of at least about 5, and most preferably at least about 10.

All of the above requirements obtain wherever the process of the invention is carried out, such as at a dockside facility, at a dedicated waste treatment plant or on board ship. Further, in the event that the process is carried out in the most preferred manner, on board ship, the centrifuge must be compact, with a small footprint, preferably no more than about 10 or 12 $ft^2$, and lightweight, to minimize its impact on the space and weight limitations imposed onboard a ship. Finally, it must be relatively insensitive to the normal pitching and rolling motions and vibrations of a vessel at sea.

Although this list of requirements is extensive, a number of modern centrifugal separators are able to meet them. A particularly preferred type is an annular centrifugal separator. This type of centrifuge offers long residence times compared with bowl-type separators. Further, the annular design keeps the rotor full even at low flow rates, thus allowing for very high turn-down ratios. Annular separators differ from bowl-type separators in that they do not use a central disk, leaving the rotor completely open and accessible for efficient in-place cleaning.

Suitable centrifuges of this type are available from Costner Industries Nevada Corporation (CINC) (Carson City, Nev.), and may be obtained in various throughput capacities to accommodate waste streams from different sizes of ships. A preferred mid-size centrifuge can handle a throughput of up to 30 gallons per minute, and can operate at up to 900 G's at about 2,600 rpm. Such a unit has a footprint of about 2 ft by 2 ft and is about 5 ft high.

The centrifugal separator separates the solids, free-phase oil, and most of the unstable emulsified oil from the waste water. The light-phase oil stream from the centrifuge, 104, containing the small volume of concentrated oil/solids, may be sent to any destination. If the system is used onboard, it may be most convenient to store this material for subsequent onshore disposal. The volume of this light phase obviously depends on the amount of oil that was present in the raw feed, but is generally very small, representing only a few percent or less of the volume of the feed stream. Thus, the storage problem presented by this waste is enormously reduced compared with the problem of storing the entirety of the contaminated wastewater.

Alternatively, the concentrated waste may be treated or disposed of on the ship, such as by incineration. Other treatments that could be used to handle this stream, either onboard ship or onshore, include, but are not limited to, membrane or other separation processes, chemical treatment, bioreaction, oxidation, combustion with or without energy recovery, or thermal treatment.

The heavy-phase, oil-depleted water stream, 103, is withdrawn from the centrifuge. The centrifuge should preferably have removed most or all of the free-phase oil from the raw wastewater. In this case, most or all remaining oil in stream 103 should be either dissolved in, or emulsified with, the water. Typically, therefore, this stream contains no more than about 500 ppm oil, more preferably no more than about 200 ppm oil, and most preferably no more than about 100 ppm oil.

Stream 103 is passed to a membrane separation step, 105. FIG. 1 shows stream 103 in the simplest manner as passing continuously and directly to step 105. It is within the scope of the invention, however, to adjust the temperature of the stream, to incorporate a pump to apply pressure for the membrane separation step, to use a surge tank to moderate flow or composition spikes, to mix in other streams that are amenable to membrane separation treatment, to add cleaning agents to stream 103, and so on, as may be desired in or dictated by specific circumstances.

The membrane separation step is a filtration step. Usually, and preferably, the step is performed under ultrafiltration conditions, that is, conditions where the pressure applied on the feed side in relatively low, as discussed in more detail below. In general, therefore, the process is described from here on mostly as it relates to operation of the membrane separation step as an unltrafiltration step. However, depending on the exact content of the wastewater and other circumstance-specific factors, it may be practical or desirable in some cases to operate the membrane separation step in other membrane filtration modes, such as reverse osmosis, nanofiltration or microfiltration mode, and all membrane filtration processes are intended to be within the scope of the invention.

The membrane separation step differs from traditional membrane filtration treatment in that it uses a membrane with a separating layer that is dense, that is, nonporous. Although such membranes have been studied in the laboratory and reported in the literature, as mentioned in the Background section above, they have not been used in any real applications to applicants' knowledge. Application of membrane filtration to wastewater treatment has continued to be hampered by the susceptibility of porous membranes to fouling, both internally and on the surface.

Internal fouling is caused by penetration of clogging materials into the interior passageways of the membrane pores. Such material is very difficult to dislodge, even by the most aggressive cleaning, and causes irreversible fouling. The membranes of the invention present a dense, non-porous, and essentially defect-free surface to the feed solution, making this type of internal fouling impossible. This is a major improvement over, for example, the porous ceramic membranes currently being tested by the U.S. Navy.

Surface fouling arises from the build-up of a precipitated layer of non-permeating materials on the membrane surface. This layer presents an additional resistance to water permeation and reduces transmembrane water flux, rendering the unit progressively less efficient, and ultimately unusable. Surface fouling of traditional porous membranes can be controlled by promoting turbulent flow in the feed channels, by judicious choice of membrane materials, and by regular cleaning.

The membranes of the invention are not immune from surface fouling. However, the problem is ameliorated in two ways. First, since the membranes are required to permeate water and reject oils, it is preferred that the layer responsible for the separation properties comprises a hydrophilic polymer. By hydrophilic, we mean that the polymer swells (as measured by its equilibrium percentage increase in weight) by at least about 15%, and preferably by at least about 20%, when immersed in water. The hydrophilicity of the membrane discourages oil and any other hydrophobic materials present in the wastewater from adhering to the membrane surface. A hydrophilic membrane material could also be used with a traditional porous membrane structure. However, the use of a hydrophilic and non-porous layer for the filtration membrane controls surface fouling in a second manner.

The non-porous membranes of the present invention provide a much greater surface for active filtration per unit area of membrane than traditional filtration membranes, because the entire membrane surface, not just the pore area, is available to transport the permeating components. A representative surface porosity for a traditional porous ultrafiltration membrane is about 1%. All permeating material has to pass through these pores. Therefore, the effective filtration area available in the membranes of the present invention is typically about two orders of magnitude greater than the corresponding area in a porous membrane. As shown in the Examples section below, this leads to a corresponding reduction in the formation of a fouling layer on the membrane surface.

Representative hydrophilic membrane materials that may be suitable for use in the process of the invention include, but are not limited to, polyvinyl alcohol, cellulose and cellulose derivatives, such as cellulose acetate, cellulose triacetate and hydroxyethylcellulose, ether- and ester-based polyurethanes and diverse copolymers incorporating polyether or other hydrophilic segments.

The most preferred membrane materials are polyamide-palyether block copolymers having the general formula $$HO\left[\underset{\displaystyle O}{\overset{}{\underset{\|}{C}}}-PA-\underset{\displaystyle O}{\underset{\|}{C}}-O-PE-O\right]_n H$$

where PA is a polyamide segment, PE is a polyether segment and n is a positive integer. The polyamide segment determines the mechanical properties of the polymer, and the polyether segment controls permeation properties. Such polymers are available commercially as Pebax® (Atochem Inc., Glen Rock, NJ) or as Vestamid® (Nuodex Inc., Piscataway, NJ). The preparation of composite membranes made from these types of materials are is described in detail in U.S. Pat. No. 4,963,165, as mentioned above, incorporated herein by reference in its entirety.

Pebax® is available in a variety of grades. An increase in the polyether content in the copolymer increases the hydrophilicity, which results in higher water fluxes. The most hydrophilic grades currently available, Pebax® 1074 and Pebax® 1657 (formerly 4011), are capable of absorbing large amounts of water, reportedly 50% and 120 wt % water, respectively; therefore these are the preferred grades for use in the process of the invention.

Other examples of block copolymers that may be used are those incorporating polyethylene oxide ($C_2H_4O$) segments, in conjunction with polyamide, polyimide, polysulfone or other glassy segments to give mechanical strength to the polymer.

The membrane may take the form of a homogeneous film, an integral asymmetric membrane, a multilayer composite membrane, or any other form known in the art. If the hydrophilic membrane comprises a glassy polymer or at least a copolymer incorporating glassy segments, this membrane will be relatively strong mechanically, even if water swollen by 100% or more. Nevertheless, this layer is usually extremely thin, so the preferred form for the membrane is a composite membrane including a microporous support layer for mechanical strength, coated directly or indirectly with a hydrophilic polymer layer that is responsible for the separation properties. The microporous support layer may be made from a polymeric material, a ceramic or other inorganic material, metal, or any other suitable material. Such composite membranes are very well known in the art. The membrane may also include other layers if desired.

The membranes may be manufactured as flat sheets, tubes, or fibers, and housed in any convenient module form, including spiral-wound modules, plate-and-frame modules and potted fiber or tubular modules. Ceramic membranes may be in the form of tubes or perforated blocks. The making of all these types of membranes and modules is well known in the art. Flat-sheet membranes in spiral-wound modules are our most preferred choice. Since conventional polymeric materials are used for the membranes, they are relatively easy and inexpensive to prepare and to house in modules.

Whatever their composition and structure, the membranes should preferably have a rejection of free-phase oil and emulsified oil of at least about 99%, and most preferably should approach 100% rejection. The rejection of dissolved oil should also be as high as possible. As a guideline, rejection of dissolved oil should typically be at least about 50%, more preferably at least about 80% and most preferably at least about 90% or more.

The degree of rejection of other dissolved materials depends on the nature of the solute. Inorganic salts such as sodium chloride and magnesium sulfate are not well rejected by the swollen hydrophilic membranes. On the other hand, dissolved hydrophobic organic compounds, even those of low molecular weight, such as trichloroethylene (TCE) and toluene, are at least partially rejected, with typical rejections of 10%, 35%, 50% or more. Surfactants are also rejected to some extent. For example, the rejection for DC 193, a neutral stabilizing surfactant (Dow Corning, Midland, Mich.) is about 80%. A higher surfactant rejection may be achieved when the surfactant is part of the emulsion phase, as it frequently will be in the case of bilge water.

In other words, the molecular weight cutoff values for the dense hydrophilic filtration membranes of the invention are lower for hydrophobic compounds than for hydrophilic compounds. This highlights another advantage of nonporous membranes over conventional porous membranes: the dense, nonporous membranes partially reject dissolved organic compounds, whereas conventional porous membranes do not. Therefore, the process of the invention provides significantly better performance than would be expected if porous filtration membranes were to be used. This is beneficial in the treatment of shipboard-generated wastewater, which often contains a variety of dissolved organic compounds and surfactants. The membranes will reduce discharge not only of oils, but also of diverse low molecular weight organics and of surfactants. Thus, concentrations of surfactants in the dischargeable water stream are expected to be no more than about 100 ppm.

These properties also mean that the process of the invention provides a significant improvement over the use of OWS systems, which are unable to remove emulsified oil or any dissolved components from the wastewater.

As mentioned above, the preferred membrane structure is a composite membrane, with the layer responsible for the filtration properties forming a thin coating on an underlying support membrane. To provide high water flux, the filtration layer should be very thin, preferably no more than about 5 μm thick, more preferably no more than about 1 μm thick, and most preferably no more than about 0.8 μm thick or even 0.5 μm thick.

Under normal operating conditions, membrane of this thickness can generally provide transmembrane water fluxes of at least about 50 $kg/m^2$.h and frequently as high as 100 $kg/m^2$.h or more. In some applications, lower water fluxes, such as 10 $kg/m^2$.h or 20 $kg/m^2$.h, will suffice and thicker membranes may be used.

A driving force for transmembrane permeation is provided by a pressure difference between the feed and permeate sides of the membrane. This is usually, but not necessarily, achieved by means of a pump in the membrane feed line. Increasing the pressure difference results in an increase in transmembrane flux of all components. At low pressure differences, this relationship is linear. However, as the transmembrane pressure difference increases, the concentration of retained material carried by convection to the membrane surface increases, encouraging formation of a gel layer which leads to increased resistance to water permeation and hence reduced flux.

Therefore, high applied pressures tend both to increase surface fouling and decrease rejection of macromolecules, and are neither required nor preferred. As a general guide, the applied pressure on the feed side should be no higher than about 600 psia, if the membranes are operating in the reverse osmosis range, and more preferably no higher than about 200 psia. Most preferred operating pressures are lower, consistent with typical operating pressures for ultrafiltration, in the range about 50–150 psia.

The ratio of total volume of permeate flow to total volume of feed flow in membrane separation step 105 is known as the stage cut, and depends, at least in part, on the membrane area available for permeation. A very low stage cut, such as 5% or less, provides a high purity water stream as permeate stream 107. However, if only 5% of the feed flow permeates the membranes, the remaining 95% is retained on the feed side and needs to be stored or handled in some manner, as discussed in more detail below. In contrast, a very high stage cut, such as 90%, leaves a residue stream of only 10% of the feed volume to be dealt with, but tends to promote a high oil concentration at the membrane surface, leading to increased surface fouling, and results in a lower permeate purity.

In general, our preference is to operate at a relatively low stage cut, by which we mean a stage cut of no more than about 50%, more preferably no more than about 30% and most preferably no more than about 20%.

Under these conditions, the permeate water stream, 107, from the membrane separation step typically contains extremely low levels of oil, by which we mean oil as measured with an oil and grease test such as EPA test 1664A or equivalent. Typical oil content is less than about 50 ppm oil, preferably less than about 20 ppm oil, more preferably less than about 10 ppm oil, and most preferably about 1 ppm oil. Most preferably, this stream is discharged overboard. Alternatively, the permeate water stream may be subjected to further treatment, as discussed with regard to FIG. 4, or sent to any other desired location.

The oil-enriched residue stream, 106, is withdrawn, and may be stored for onshore treatment or disposal, subjected to further treatment onboard ship, or recirculated within the process for further removal of oil. A preferred option is to recirculate at least a portion of stream 106 within the process, as discussed with respect to FIG. 2 below.

The membrane filtration unit can include a single membrane module or a bank or array of multiple membrane modules. A single bank of membrane modules is usually adequate to meet the processing requirements for many applications. If additional processing is desirable, an array of modules in a multistep or multistage configuration with recycle of intermediate streams, as is known in the art, may be used. Such an arrangement is discussed in more detail below with respect to FIG. 3.

Figure 2:
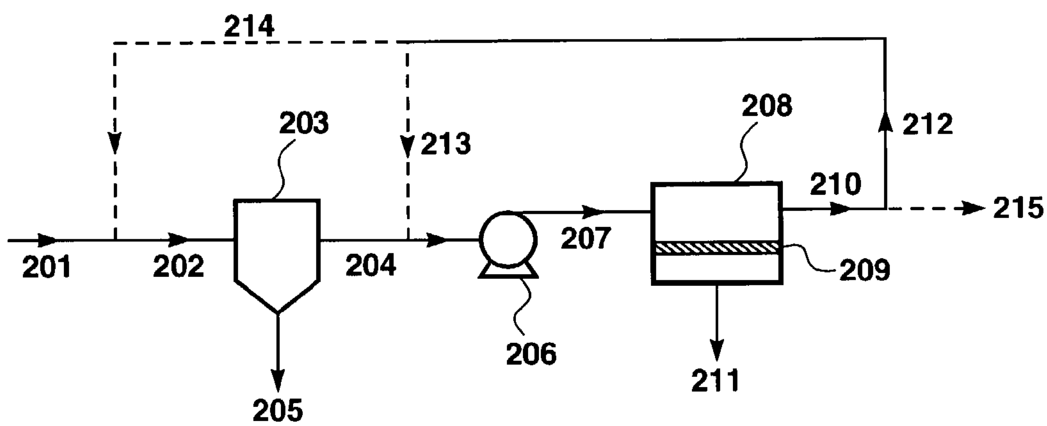
FIG. 2 is a schematic representation of a preferred embodiment of the process of the invention that includes recirculation of the membrane residue stream within the process.

Turning now to FIG. 2, this shows a preferred embodiment of the invention including recirculation of the membrane residue stream within the process. Feed stream 201 is mixed with at least a portion of membrane residue stream 210 to form the feed stream 202 to centrifugal separator 203. The requirements and preferences for centrifugal separation step 203 are the same as for step 102 in FIG. 1 unless otherwise stated. The light phase from the centrifugal separator, stream 205, containing concentrated oil and solids, if any, is discharged from the centrifugal separator and may be stored, treated or sent to any appropriate destination as discussed above for FIG. 1.

The heavy phase, water stream, 204, is pumped via pump 206 and passed as stream 207 to membrane separation step, 208. Pump 206 may be any type of liquid pump. As mentioned above, high applied pressures are not preferred, so the pumping pressure should preferably be preferably no higher than about 200 psia, and most preferably should be in the range 50–150 psia. Membrane separation step 208 contains one or more dense, non-porous membranes, 209, as discussed above in FIG. 1. Step 208 divides stream 207 into permeate water stream 211, and oil-enriched residue stream 210. The requirements and preferences for membrane separation step 208 are the same as for step 105 in FIG. 1 unless otherwise stated.

As discussed above with respect to FIG. 1, it is preferred to operate the membrane separation step in such a manner as to keep the stage cut relatively low, such as below 50%, 30% or 20%. Thus, the flow rate of stream 210 is usually larger, and typically as much as 5, 10 or more times larger, than that of stream 211.

FIG. 2 shows several options for recirculating stream 210, including recirculation to the centrifugal separation step, 203, recirculation to the membrane separation step, 208, and recirculation to both steps. The entirety of stream 210 can be sent via lines 212 and 214 for recirculation to the centrifugal separation step, with no recirculation in line 213. In this way, a relatively low oil content is maintained in the feed to the membrane separation step. However, operation in such manner increases the size, weight, capacity and energy consumption of the centrifugal separator substantially. If such increases are acceptable, the process may be operated in this manner.

At the other extreme, all of stream 210 could be recirculated through lines 212 and 213 to the membrane separation step in a feed-and-bleed type of mode, with no recirculation in line 214, and purge stream 215 being withdrawn as the oil concentration in the membrane loop reached a certain level. This mode of operation is not considered viable for this application, because the only way for oil to exit the membrane separation step in this case would be through streams 211 and 215. This would lead to undesirably high oil levels in permeate stream 211, as well as surface fouling owing to increased oil concentration on the feed side of the membrane. Furthermore, stream 215 would be of high flow rate and would still require storage or further treatment.

In practice, therefore, it is usually preferred to find a balance between these extreme modes by recirculating stream 210 in part through line 213 to the membrane separation step and in part through line 214 to the centrifugal separation step. The optimum split between the proportions recirculated to each step will depend on specific circumstances and should be determined by considering the maximum acceptable capacity for the centrifugal separator and the tolerance of the membrane equipment to increased oil content. As a guideline, if economics dictate the split, the ratio 214:213 should preferably be greater than 50:50, such as 60:40, 70:30, 80:20 or even 90:10 or above. Conversely if performance is the controlling factor, the ratio 212:211 should preferably be less than 50:50, such as 40:60, 30:70, 20:80 or even 10:90 or below.

Operating in recirculation mode in the manner of FIG. 2 yields two product streams—a very small waste oil stream, 205, to be further treated and/or stored, and a dischargeable water stream, 211. The ability of the integrated system to produce dischargeable water is an important aspect of the process of the invention. The ability to achieve enormous reduction in the volume of waste that must be stored is another. The integrated embodiments of the type shown in FIG. 2 can achieve close to complete separation of free phase, emulsified and dissolved oil from water. The oil phase, 205, contains only small amounts of water. Hence its volume is substantially determined by the volume oil content of feed stream 201. For example, if the total oil content by volume of stream 201 is 1%, the volume flow of stream 205 will be about 1–2% of the volume flow of stream 201, and the waste storage capacity can be correspondingly reduced to 1–2% of the capacity that would be needed absent the present process.

Figure 3:
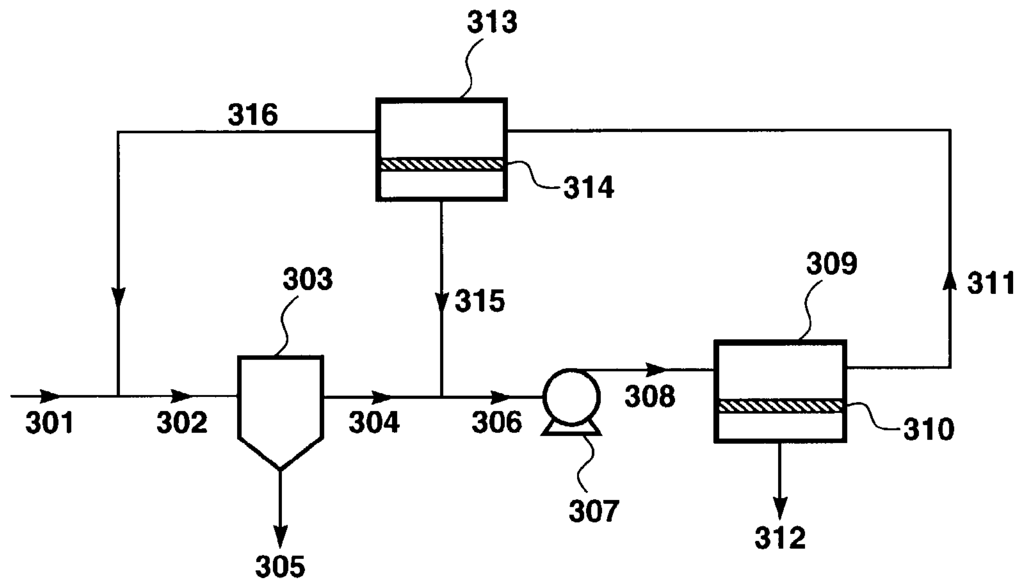
FIG. 3 is a schematic representation of a particularly preferred embodiment of the process of the invention that includes selective recirculation of the membrane residue stream within the process.

FIG. 3 shows a preferred variant of the embodiments of FIG. 2, in which a second membrane separation step is used to provide selective return of the recirculation streams to the membrane separation and centrifugal separation steps. Requirements and preferences for this embodiment are the same as for the embodiments of FIG. 2 unless otherwise stated.

Referring to FIG. 3, feed stream 301 is mixed with the second membrane residue stream, 316, to form the feed stream 302 to centrifugal separation step 303. Step 303 produces a light concentrated oil phase, 305, which is withdrawn, and a heavy oil-depleted water phase, 304. Stream 304 is mixed with second permeate stream 315 to form stream 306, passed to pump 307, and fed as stream 308 to membrane separation step, 309. Membrane separation step 309 contains one or more dense, non-porous membranes, 310, as discussed above in FIG. 1. The first permeate water stream, 312, is withdrawn as the purified water product stream.

At least a portion of the oil-enriched residue stream, 311, is passed as feed to a second membrane separation step, 313. The membranes, 314, used in this step should also most preferably permeate water and reject oil, and may, but need not, be the same as membranes 310. The second permeate stream, 315, is mixed with water stream 304, and recirculated for treatment by membrane step 309. Like the permeate stream from first membrane separation step 308, stream 315 has a very low oil content, for example, 50 ppm oil, 20 ppm oil, 10 ppm oil or less. Thus the recirculation of this stream does not result in an increase in the overall oil concentration on the feed side of step 309, as is the case with the embodiments of FIG. 2. Rather the recirculation of stream 315 dilutes stream 304, thereby leading to a lower oil content in product stream 312.

The second residue stream, 316, is further enriched in oil compared with stream 311. This stream has, therefore, been twice enriched in oil by the two membrane separation steps through which it has passed. Stream 316 is recirculated to the front of the process and mixed with stream 301.

Thus, step 313 serves essentially as a selective valve, preferentially recirculating water to the first membrane separation step, 309, and oil to the centrifugal separation step, 303. The stage-cut used in step 313 may be adjusted on a case-by-case basis, depending whether it is more important to reduce the volume flow of water to limit the required capacity for step 303 or to maintain a very low oil content in stream 315.

A further benefit of this design is that rejected organic components in stream 316 are remixed with comparatively oil-rich stream 301 as stream 302. This allows dissolved oil and other organic components that tend to be rejected in the membrane steps to partition into the oil in stream 301 and to be removed from the loop in stream 305.

As shown in FIG. 3 and described above, membrane separation step 313 is performed using membranes that preferentially permeate water and reject oil. As an alternative, it is possible to operate step 313 using membranes that preferentially permeate oil and reject water. In this case, the water-enriched residue stream from step 313 would be recirculated to first membrane separation step 309, and the organic-enriched permeate stream would be recirculated to the centrifugal separation step.

As yet another, although less preferred alternative, any oil/water separation technique, membrane- or non-membrane based, may be used to perform step 313.

As shown in the examples section below, configurations such as that of FIG. 3 have improved performance compared with the unselective recirculation. However, the system is more complicated and requires considerably more membrane area.

Figure 12:
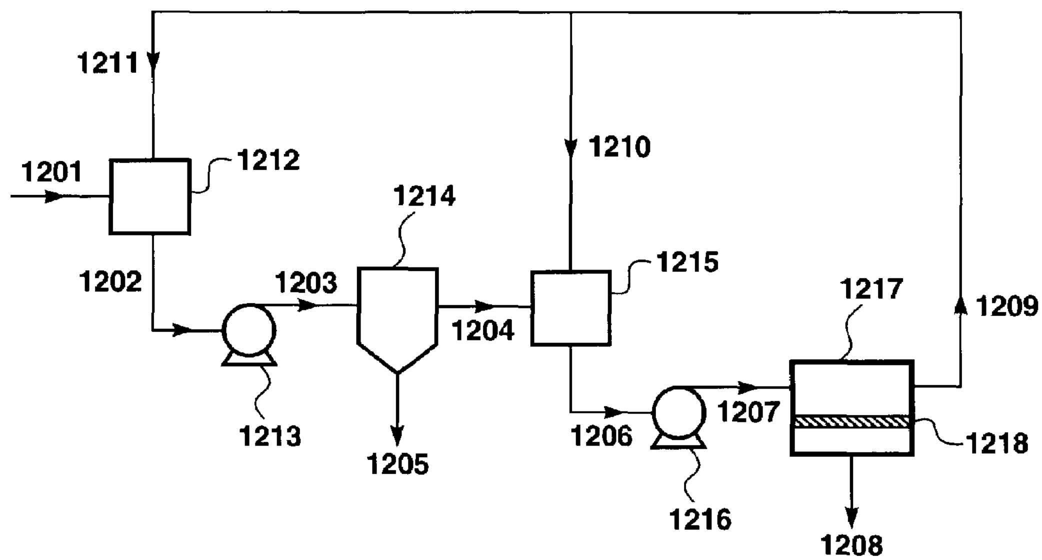
FIG. 12 is a schematic representation of the process of the invention, including optional feed tank and holding tank.

FIG. 12 shows another preferred embodiment of the embodiments of FIG. 2, in which a buffer or surge tank is used between the centrifugal and membrane separation steps, and optionally a tank is used before the centrifugal separation step. Requirements and preferences for this embodiment are the same as for the embodiments of FIG. 2 unless otherwise stated.

Referring to FIG. 12, feed stream 1201 is passed to optional tank 1212, where it is allowed to mix, and preferably thoroughly mix, with a portion of membrane residue stream 1209. Tank 1212 forms a buffer volume to protect the unit used in step 1214 from spikes in oil concentration and/or flow surges, as well as providing for the process to be operated in batch, rather than continuous, mode.

Stream 1202 is withdrawn from the tank as desired and pumped as stream 1203 by pump 1213 to centrifugal separation step 1214. The light concentrated oil phase is withdrawn as stream 1205. The heavy oil-depleted water phase, 1204, from the centrifugal separation step is passed to tank 1215, where it is allowed to mix, and preferably thoroughly mix, with a portion of membrane residue stream 1209. Tank 1215 protects the membrane separation unit both from flow surges, and, more importantly, from spikes in oil concentration that could cause the discharged permeate to be out of specification with respect to oil contamination.

Combined stream 1206 is pumped from tank 1215 via pump 1216 as feed stream 1207 to membrane separation step 1217. Membrane separation step 1217 contains one or more dense, non-porous membranes, 1218, as discussed above in FIG. 1. The permeate water stream, 1208, is withdrawn. Oil-enriched residue stream, 1209, is withdrawn from the membrane separation step 1217, split in any appropriate ratio as desired into streams 1210 and 1211, and recirculated to the centrifugal and membrane separation steps as described with respect to FIG. 2.

Yet more preferably, but not shown for simplicity, this split may be performed selectively by means of an additional membrane separation step, as shown in FIG. 3, or any other appropriate separation step.

Figure 4:
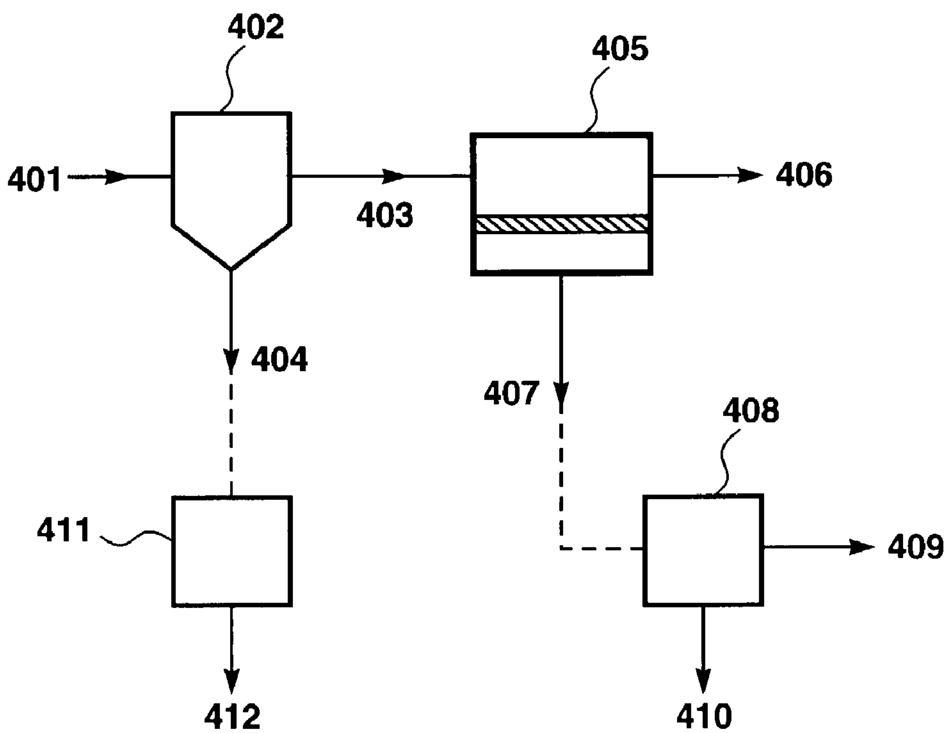
FIG. 4 is a schematic representation of an alternative embodiment of the process of the invention, including an optional permeate treatment step and an optional oil waste treatment step.

FIG. 4 shows an alternative embodiment of the invention that provides for further treatment of the oil phase from the centrifugal separator, the membrane permeate stream, or both. Requirements and preferences for the operations of FIG. 4 are as described above with respect to FIG. 1 unless stated otherwise. Referring to FIG. 4, feed stream 401 is passed to centrifugal separation step 402. Step 402 produces a light concentrated oil phase, 404, which is withdrawn and sent to onboard or onshore optional treatment step 411.

As already mentioned, any treatment capable of wholly or partially disposing of the oil phase is within the scope of the invention and may be used in this step. Such treatments include, but are not limited to, membrane separation, chemical treatment, bioreaction, oxidation, combustion with or without energy recovery, and thermal treatment. If allowed, complete destruction by incineration is simple and most preferred. Materials exiting step 411, if any, are indicated by stream 412.

The heavy water phase, stream, 403, is passed to membrane separation step 405. The oil-enriched residue stream, 406, is withdrawn. The permeate water stream, 407, is passed to optional treatment step 408 to reduce the oil content of the water still further.

Any treatment capable of the appropriate water/oil separation is within the scope of the invention and may be used in this step. Such treatments include, but are not limited to, membrane separation, including further filtration treatment by porous or non-porous membranes, other physical treatment, such as adsorption, biological treatment or chemical treatment. The most preferred option is to avoid the need for step 408 by adopting a design, such as that of FIG. 2 or 3, that enables a desired target water purity to be met by stream 407. If this cannot be achieved, another physical treatment step is usually preferable to biological or chemical treatment, which are ill suited to shipboard use.

In this case, water meeting target specifications for the step is withdrawn as stream 410, and oil-enriched waste stream 409 is recirculated or mixed with another stream as appropriate to its composition.

The processes of the invention have been described as they apply to the treatment of oily wastewaters that arise from commercial and naval shipping. In a more general aspect, such processes can be applied with success to any oily wastewater stream that requires better separation than can be obtained from traditional parallel-plate separators or other stationary gravity separators. As just one example, the process of the invention is suitable for treating produced waters generated at the wellhead in conjunction with oil and gas production.

The attributes that render the invention particularly well suited for shipboard operations-small size and weight, simplicity of operation, and ease of maintenance—also make our processes well suited for installation on offshore platforms, as well as other locations where space is valuable or where full-time operator attendance is costly or impractical to provide.

In another aspect, the invention includes the equipment, system or apparatus for carrying out the disclosed water treatment processes. The invention in a most preferred form in this aspect can be understood by reference again to FIGS. 2, 3 and 12.

Referring to FIG. 2, the equipment comprises a centrifugal separator, 203 and a membrane separation unit, 208. The centrifugal separator may be of any type, but is usually a hydrocyclone or centrifuge, and preferably an annular centrifuge.

Centrifugal separator 203 is equipped with a feed water inlet line, 201/202, a light-phase outlet line, 205, and a heavy-phase outlet line, 204.

Membrane separation unit, 208, is equipped with a membrane feed inlet line, 207, a residue outlet line, 210, and a permeate outlet line, 211. Unit 208 contains one or more dense, non-porous membranes, 209. The dense, non-porous membranes can be in any convenient form, such as tubes, fibers or sheets, and may be supported on a polymeric, inorganic, metal or other support structure, as is well known in the art.

The membranes are preferably composite membranes, with a dense, non-porous and substantially continuous, defect-free hydrophilic layer that is responsible for the separation properties. The membranes should preferably provide essentially complete, 99% or better rejection of free-phase and emulsified oils, as well as rejection of dissolved oil, of preferably 50%, more preferably at least about 80% and most preferably at least about 90% or more.

As shown in FIG. 2, the equipment also includes a liquid pump, 206, with inlet line 204 and outlet line 207, positioned between the heavy-phase outlet and the membrane feed inlet, into which heavy-phase outlet line 204 passes, so that the heavy-phase may pass out of the centrifugal separator and be pumped by flowing via pump 206 into line 207 and thence into the membrane separation unit. The pump may be any type of liquid pump.

As shown in FIG. 2, residue outlet line, 210, is connected to a residue recirculation line, 212, through which any or all of the residue may be recirculated via line 213 to membrane separation unit 208, or via line 214 to centrifugal separator 203.

Permeate outlet line, 211, provides for discharge of treated water from the apparatus to any desired destination, and most preferably directly overboard. Optionally a monitor may be positioned in line 211 to monitor the content of TOC, oil or other specific organic components in the treated water stream. The monitor may also be connected to valves, switches and/or other flow control equipment to divert the permeate stream to a holding tank or elsewhere as desired if the content fails to meet target specifications at any time.

Optionally, but not necessarily, a purging means, line 215, may be added in line 210. Purging allows control of the volume of oil and/or dissolved organic components that may build up in the recirculation loop.

The apparatus as shown in FIG. 2 (as well as the other figures) may also include additional components, such as heaters, chillers, pumps, blowers, other types of separation and/or fractionation equipment, tanks, valves, switches, controllers, pressure-, temperature-, level-, flow- and concentration measuring devices as required or desired.

Turning again to FIG. 3, this shows a preferred apparatus in which a second membrane separation step is used to provide selective return of the recirculation streams to the first membrane separation and centrifugal separation steps. Requirements, preferences and options for this embodiment are the same as for the embodiments of FIG. 2 unless otherwise stated.

Referring to FIG. 3, the equipment comprises a centrifugal separator, 303, equipped with a feed water inlet line, 301/302, a light-phase outlet line, 305, and a heavy-phase outlet line, 304. The heavy-phase outlet line is connected via pump inlet line 306 to pump 307, so that the heavy-phase may pass out of the centrifugal separator and be pumped by flowing via pump 307 into line 308 and thence into a first membrane separation unit, 309.

First membrane separation unit 309 is equipped with a first membrane feed inlet line, 308, a first residue outlet line, 311, and a first permeate outlet line, 312, and contains one or more dense, non-porous membranes, 310.

The first residue outlet line, 311, is connected as a second membrane inlet line to second membrane separation unit, 313, containing one or more dense, non-porous membranes 314. The membranes used in unit 313 should most preferably permeate water and reject oil, and may, but need not, be the same as those used in unit 309. Second permeate outlet line 315 from unit 313 is connected in the line formed by heavy-phase outlet 304 and pump inlet line 306, to enable permeate to be recirculated to first membrane unit 309.

Second residue outlet line, 316, is connected in centrifugal separator inlet line 301/302 to enable residue from unit 313 to be recirculated to centrifugal separator 303.

As stated above with respect to the process description, unit 313 may be replaced by any other appropriate type of separation unit.

FIG. 12 shows another preferred apparatus design, in which a buffer or surge tank is used between the centrifugal separator and membrane separation unit, and optionally a feed tank is used before the centrifugal separator. Again, requirements, preferences and options for this embodiment are the same as for the embodiments of FIG. 2 unless otherwise stated.

Referring to FIG. 12, feed tank 1212 has a raw feed line, 1201, and a feed outlet line, 1202, which also forms the pump feed inlet line to pump 1213. Pump outlet line 1203 from pump 1213 also forms the inlet line to centrifugal separator 1214, which is equipped with light-phase outlet line, 1205, and heavy-phase outlet line, 1204. Line 1204 is connected as an inlet line to tank, 1215.

Outlet line, 1206, carries liquid flowing out of tank 1215 via pump 1216 to membrane separation unit, 1217, via membrane feed inlet line, 1207. Membrane separation unit 1217 is further equipped with a membrane residue outlet line, 1209, and a permeate outlet line, 1208. The membrane unit contains one or more dense, non-porous membranes, 1218.

Residue outlet line 1209 is connected to tank 1215 through line 1210 and to tank 1212 through line 1211, enabling residue to be recirculated to these tanks in desired proportions, such as by means of a valve (not shown) in line 1209.

The invention is now further described by the following examples, which are intended to be illustrative of the invention, but are not intended to limit the scope or underlying principles in any way.

EXAMPLES

Example 1

Membrane and Module Preparation

Composite membranes were made from both Pebax® 1074 and Pebax® 1647 grades (Atochem, Inc., Glen Rock, N.J.) in a two-step process. First, a microporous support layer of polyvinylidene fluoride (PVDF) was cast onto a fabric web. In the second step, the support layer was coated with the ultrathin Pebax® selective layer. After drying in an oven, a selective layer 0.5–2 μm thick was left on the support.

The selective layer thickness was determined by measuring the nitrogen flux of the composite membrane, from which the thickness of the selective layer was calculated using the known intrinsic nitrogen permeability of Pebax®. The carbon dioxide flux was also measured to ensure that the Pebax® layer was defect-free. This was done by comparing the carbon dioxide/nitrogen selectivity of the membrane with the known carbon dioxide/nitrogen selectivity of Pebax® films.

The defect-free membranes were incorporated into 2.5-inch-diameter spiral-wound modules with a membrane area of about 1 $m^2$. The Pebax® 1074 and Pebax® 1657 spiral-wound modules were tested using a bench-scale module test system. The feed pressure in this cross-flow filtration system can be varied from 0 to 200 psig, and the flow rates can be controlled over the range of 0 to 6 gpm. The Pebax® modules were tested with pure water at feed pressures of 50, 100 and 150 psig at 25° C. feed temperature. Table 1 shows the pure water fluxes as a function of feed pressure.

TABLE 1

| Pressure | Flux (kg/$m^2$ · h) | |
|---|---|---|
| (psig) | Pebax ® 1074 | Pebax ® 1657 |
| 50 | 47.2 | 55.3 |
| 100 | 105.0 | 103.5 |
| 150 | 155.7 | 129.0 |

Example 2

Permeation Properties of Modules with Model Solutions

Before beginning tests with simulated bilge water, the permeation properties of membrane modules, prepared as in Example 1, were measured with clean water and simple model solutions, using the module test system described above. During each test, the feed solution was circulated through the system at atmospheric pressure to allow the system to equilibrate. The system was pressurized only when the solute concentration in the feed had stabilized. This procedure ensured negligible accumulation of solute in the system during the tests, so that all changes in the feed composition were attributable to the membrane process.

The solute rejections of the two modules were determined with dilute aqueous solutions of magnesium sulfate, polyethylene glycol, sucrose, trichloroethylene (TCE), and toluene. The feed temperature was 25° C. and the feed pressure was 50 psig. The fluxes and solute rejections for Pebax® 1074 and Pebax®1657 modules are summarized in Table 2.

TABLE 2

| | | Pebax ® 1074 module | | Pebax ® 1657 Module | |
|---|---|---|---|---|---|
| Compound | Concentration | Flux (kg/$m^2$ · hr) | Solute Rejection (%) | Flux (kg/$m^2$ · hr) | Solute Rejection (%) |
| Pure Water | — | 47 | — | 55 | — |
| $MgSO_4$ | 2.0 wt % | 43 | 21 | — | — |

TABLE 2-continued

| | | Pebax ® 1074 module | | Pebax ® 1657 Module | |
|---|---|---|---|---|---|
| Compound | Concentration | Flux ($kg/m^2 \cdot hr$) | Solute Rejection (%) | Flux ($kg/m^2 \cdot hr$) | Solute Rejection (%) |
| PEG 400 | 5,000 ppmw | 43 | 4 | 46 | 5 |
| Sucrose | 700 ppmw | 51 | 4 | 61 | 2 |
| TCE | 300 ppmw | 50 | 41 | 54 | 13 |
| Toluene | 152 ppmw | 50 | 28 | 58 | 28 |

The data show that inorganic salts such as magnesium sulfate are not well-rejected by the highly swollen Pebax® membranes. Larger hydrophilic solutes, such as PEG 400 and sucrose, also permeate these membranes readily. The molecular weights of TCE and toluene are several-fold lower than the molecular weights of sucrose and PEG 400. However, the rejections of the comparatively low molecular weight hydrophobic compounds are several-fold higher than those of the PEG and sucrose. Therefore, it can be seen that the molecular weight cutoff values for Pebax® membranes are much higher for hydrophilic compounds than for hydrophobic compounds.

Example 3

Comparative Example

Figure 5:
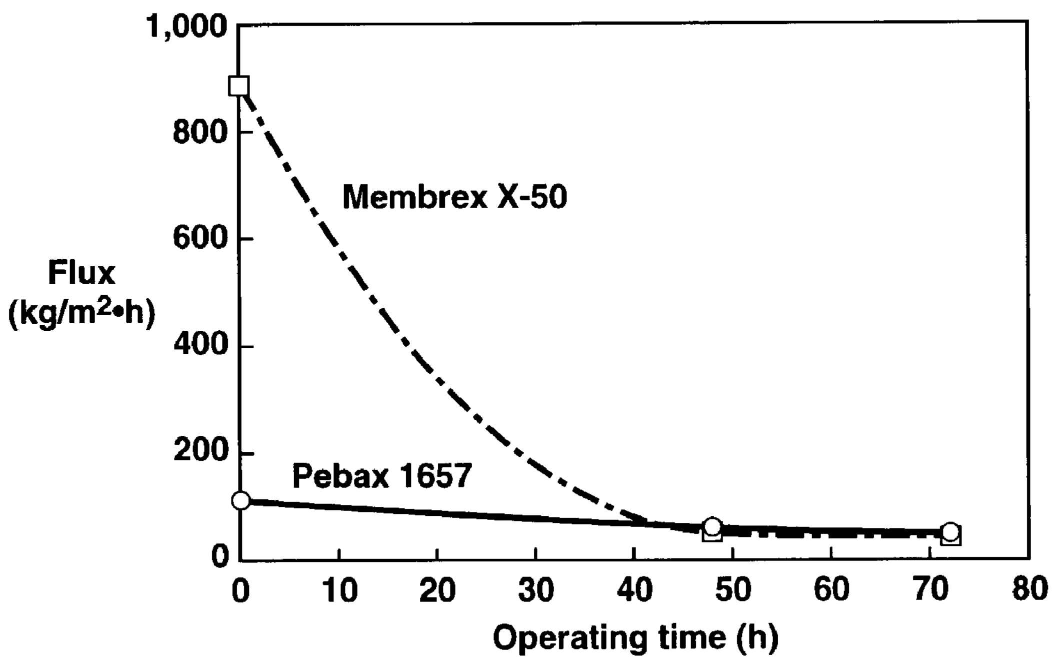
FIG. 5 is a graph showing a comparison of water fluxes as a function of operating time for two different composite membranes.

An experiment was performed to compare the flux properties of a Pebax® 1657 composite membrane with those of a commercial ultrafiltration membrane, Membrex X-50 (Osmonics, Minnetonka, Minn.). The Pebax® membranes were prepared as in Example 1; the Membrex membranes were tested as supplied from the manufacturer. Samples of the membranes were cut into 12-$cm^2$ stamps and were tested in a permeation test cell for 72 hours at a feed pressure of 600 psig and a feed temperature of 60° C. The feed composition was 1 wt % crude petroleum in water. FIG. 5 compares the total permeate fluxes of the two membranes as a function of operating time.

As can be seen, the initial fluxes of the commercial membrane were much higher than those of the experimental membrane. After a day of operation, however, the Pebax® membranes retained their flux properties and had marginally higher fluxes than the commercial membranes, which had suffered a flux drop of about an order of magnitude. Thus the experimental membranes were much more resistant to fouling than the commercial membranes under the test conditions.

Example 4

A calculation was performed to roughly estimate the effect of available membrane area on surface fouling. A representative surface porosity for a traditional porous ultrafiltration membrane was assumed to be 1%. All permeating material has to pass through these pores. In the non-porous membranes of the invention, the entire surface area of the membrane is available for active filtration. Therefore, the membranes of the invention provide a filtration area 100 times greater per unit of area of membrane surface.

At a permeate flux of 20 gal/$ft^2$ day, the permeant velocity perpendicularly toward and over the total membrane surface area is 0.06 cm/min for both the porous and non-porous membranes. However, to transport the same mass of material, the velocity at the pore openings for the traditional membrane is 100 times higher, that is, 6 cm/min.

Since fouling material is carried to, and trapped on, the membrane surface by convective flow of liquid toward the membrane, the mass of foulant that can potentially be carried in and deposited in the fouling layer is proportional (assuming no other effects) to the liquid flow velocity. Thus, use of the entire membrane surface may reduce fouling potential by as much as two orders of magnitude.

Example 5

Effect of Temperature on Water Flux on Pebax® Membranes

Figure 11:
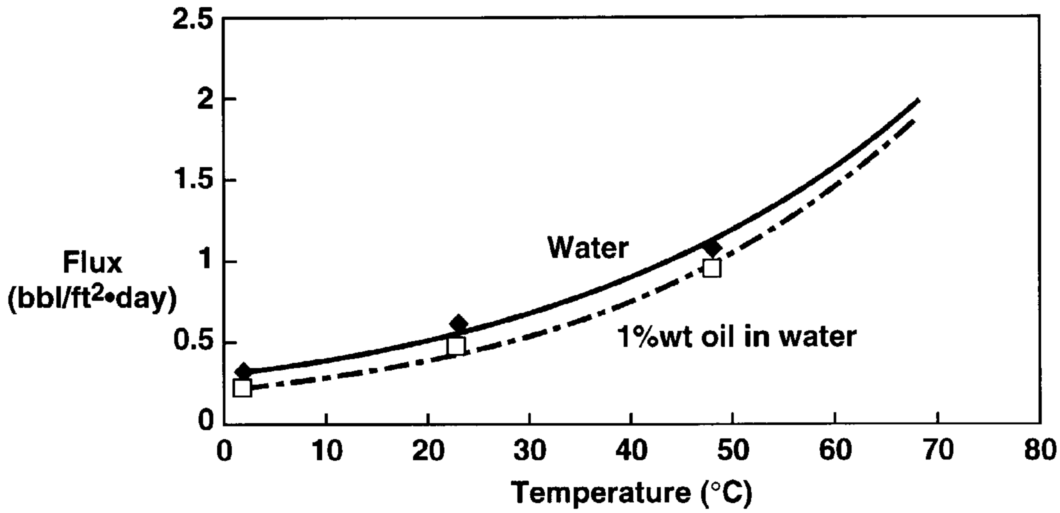
FIG. 11 is a graph showing the water flux of a Pebax® membrane module measured with tap water and with 1 wt % motor oil in water as a function of temperature.

A series of tests were performed to determine the effect of temperature on transmembrane water flux. Composite membranes were prepared as in Example 1, and a 12-$cm^2$ stamp was tested in a permeation test cell at 150 psig feed pressure and at temperatures varying from 0° C. to 50° C. The membrane was tested first with tap water, then with a solution of 1 wt % motor oil (Penzoil SAE 5W-30) in water. Motor oil was chosen because it contains ingredients found as bilge water contaminants, namely a complex mixture of detergents, volatile organic compounds (VOCs), and inorganic salts, in addition to petroleum-derived lube oils. The results of the tests are shown in FIG. 11. In both cases, the flux increased with increasing temperature.

Example 6

Chemical Stability of Pebax® Membranes

The Pebax® copolymers used to prepare the membranes for Example 1 contain amide bonds in the nylon blocks, so degradation of the membrane by high or low pH solutions or by chlorine may occur. A series of tests were performed to determine the chemical stability of the membranes. Samples of the Pebax® 1074/PVDF composite membranes were immersed in buffer solutions of pH 2, 3, 5, 8, 10 and 12 and in aqueous solutions of sodium hypochlorite (NaOCl) at concentrations of 10, 50, 100 and 1,000 ppm for one week. The NaOCl solutions were changed every two hours on the first day and then once each day thereafter. The water fluxes and solute rejections of the membranes were then measured with a 1,500-ppm sodium chloride solution and a 1,000-ppm mineral oil/100-ppm surfactant emulsion. The feed pressure was 150 psig, the feed temperature was 23° C. and the flow rate was 0.34 gpm. The water fluxes and rejections (based on TOC content) are shown in Table 3.

TABLE 3

| Soaking Solution | NaCl Solution Water Flux (L/m²h) | NaCl Solution NaCl Rejection (%) | Oil/surfactant Emulsion Water Flux (L/m²h) | Oil/surfactant Emulsion TOC Rejection (%) |
|---|---|---|---|---|
| Untreated | 35 | 13 | 32 | 92 |
| Water | 42 | 10 | — | — |
| Buffer Solution pH | | | | |
| 2 | 62 | 12 | 46 | 92 |
| 3 | 42 | 12 | 36 | 92 |
| 5 | 29 | 13 | 27 | 90 |
| 8 | 33 | 12 | 30 | 90 |
| 10 | 60 | 15 | 60 | 91 |
| 12 | 65 | 16 | 56 | 90 |
| NaOCl Concentration (ppm) | | | | |
| 10 | 31 | 11 | 38 | 92.3 |
| 50 | 25 | 11 | 32 | 92.5 |
| 100 | 45 | 10 | — | — |
| 1,000 | 24 | 15 | — | — |

The rejection of the membranes was determined by measuring the total organic carbon (TOC) concentration of the feed and permeate solutions. All of the oil was completely rejected (100% rejection), but a portion of the surfactant permeated, so that overall TOC rejections measured were in the range 90–93%.

The data in Table 3 show that the water fluxes and rejections of the membranes were essentially unaffected by exposure to the test solutions.

Examples 7–8

Long-Term Permeation Performance of Membrane Modules

Example 7

A test was performed to compare the long-term permeation properties of equivalent bench-scale modules containing an uncoated PVDF ultrafiltration membrane and a PVDF membrane coated with Pebax® 1074.

Figure 6:
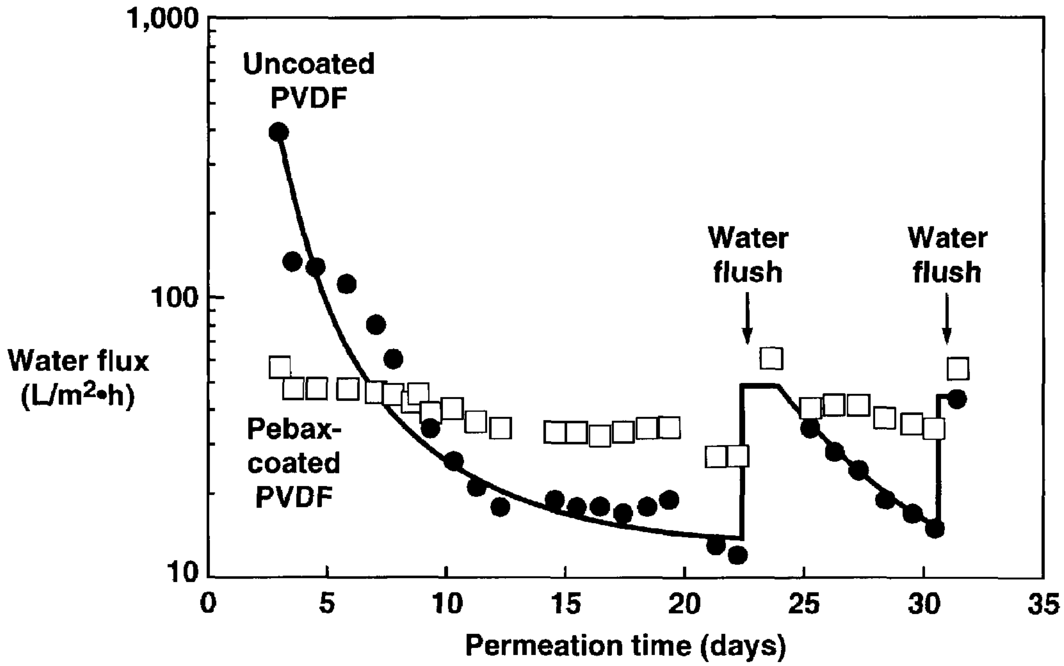
FIG. 6 is a graph showing the change in water fluxes during a long-term test for two different composite membranes.

The modules were tested with water containing 1 wt % motor oil. The module test system was operated at a feed pressure of 150 psig and a feed temperature of 23° C. The water flux was measured daily for 22 days. The results are shown in FIG. 6. The uncoated PVDF membrane initially had a much higher flux than the Pebax®-coated membrane, but over the 22-day period the uncoated PVDF flux declined 20-fold to approximately 12 $L/m^2 \cdot h$. In contrast, the initially lower flux of the Pebax®-coated membrane (50 $L/m^2 \cdot h$) was almost completely retained for the entire 22-day test.

At the end of the 22-day test period, both membranes were regenerated by flushing the system with clean water; no chemical additives or cleaning agents were used. As shown in FIG. 6, the uncoated PVDF membrane module only partially regained its original flux, showing that a large fraction of the flux decline was due to permanent internal membrane fouling. The flux of the Pebax®-coated membrane module, however, returned to its original value. When both membranes were retested with the motor oil feed solution, the uncoated membrane flux quickly declined to a low value, whereas the coated membrane maintained its previous high value.

Example 8

The experiment of Example 7 was repeated with commercially-available tubular polysulfone ultrafiltration membrane modules (Zenon, Toronto, Canada). The membrane in one module was left uncoated and the membrane in the other module was coated with a selective layer of Pebax® 1657.

Figure 7:
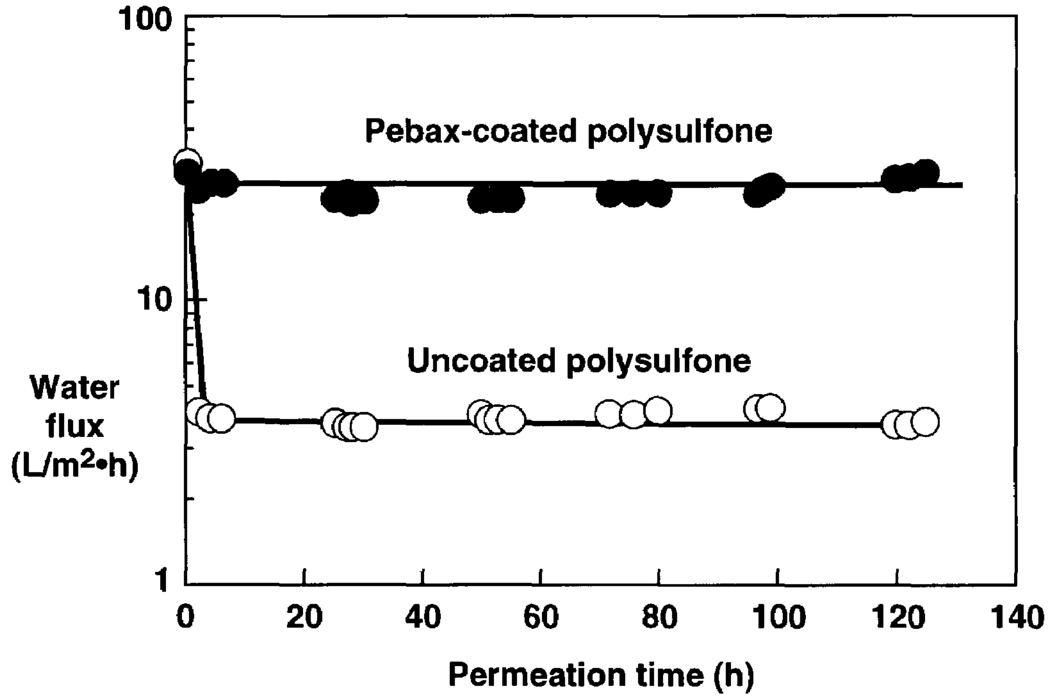
FIG. 7 is a graph showing the change in water fluxes over time for two different composite membranes.

This time, the modules were tested with an emulsion of 1,000 ppm soybean oil in water, at a feed pressure of 20 psig and a feed temperature of 25° C. The water flux was measured daily over the 5-day test period. The initial pure water flux of the uncoated polysulfone membrane module was 30 $L/m^2 \cdot h$, and that of the Pebax®-coated membrane module was a little lower at 28 $L/m^2 \cdot h$. However, as shown in FIG. 7, the flux of the uncoated membrane module immediately fell nearly 10-fold to 3.5 $L/m^2 \cdot h$, whereas that of the Pebax®-coated membrane module was essentially unchanged at 25 $L/m^2 \cdot h$ throughout the 5-day test period.

Examples 9–11

Integrated Centrifuge/Ultrafiltration System Experiment

A series of tests were undertaken to determine the performance of a combined centrifugation/ultrafiltration system. A CINC V-02 annular centrifugal separator, with a capacity of 0.5 gpm, was provided by CINC (Carson City, Nev.), and used for the centrifugal separation step. Spiral-wound modules containing Pebax® composite membranes and prepared as in Example 1 were used in the ultrafiltration step.

The system configuration was as shown in FIG. 12, with a feed tank, from which test solutions could be pumped to the centrifuge, and a holding tank for the heavy phase from the centrifuge, from which water could be fed to the membrane system. As shown in FIG. 12, the residue stream could be recirculated to the feed tank and holding tank in varying proportions. The oil waste from the centrifuge was collected and returned periodically to the feed tank. The permeate stream was also returned to the feed tank. Thus the system provided a closed loop.

Samples were collected from the feed, the centrifuge heavy phase, the residue stream and the permeate stream, and were analyzed to determine oil/contaminant concentrations. Centrifuge feed samples with substantial free-phase oil were separated into emulsified and oil fractions, and analyzed separately using a total organic carbon (TOC) analyzer and gravimetry, respectively. Permeate oil/contaminant concentrations were measured using TOC and reported as ppm of total organic carbon.

Permeate samples were also sent to an independent laboratory (Sequoia Analytical, Morgan Hill, Calif.) for analysis of the oil level using EPA test method 413.2.

The feed to the centrifuge was a well-stirred mixture of stable motor oil emulsion (up to 2,500 ppmw oil) and free-phase oil. The membrane step was operated at a feed pressure of 30 psig and a feed temperature of 23° C.

Example 9

Centrifuge System Performance

During the month-long tests, the average concentration of free-phase oil in the feed to the centrifuge was approximately 1 wt %, with occasional spikes up to 5 wt %, and the average concentration of emulsified oil varied from 1,000 to 2,500 ppmw. The total oil content of the feed ranged from about 10,000–14,000 ppmw. The CINC centrifugal separator handled the oil concentration spikes effectively. Free-phase oil was consistently completely removed.

Figure 8:
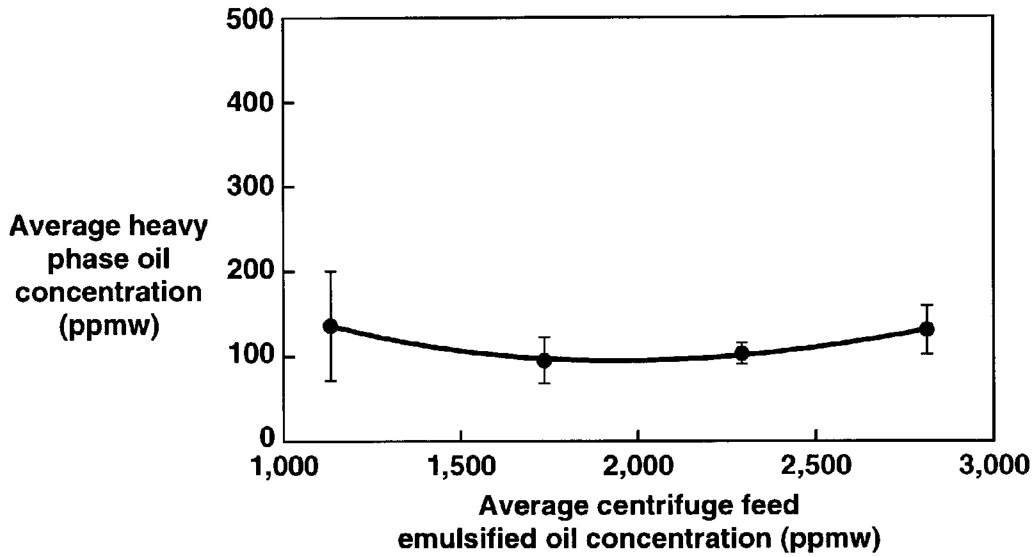
FIG. 8 is a graph showing the oil concentration in the centrifuge heavy-phase output as a function of the emulsified oil concentration in the centrifuge feed.

As shown in FIG. 8, the oil concentration of the heavy-phase water fraction from the centrifuge remained at about 120 ppmw across the average concentration range for the emulsified oil. This indicates that the centrifuge can provide a feed to the membrane system with a relatively constant oil concentration, despite substantial changes in the oil concentration of the centrifuge feed.

Example 10

Membrane Ultrafiltration System Separation Performance

Figure 9:
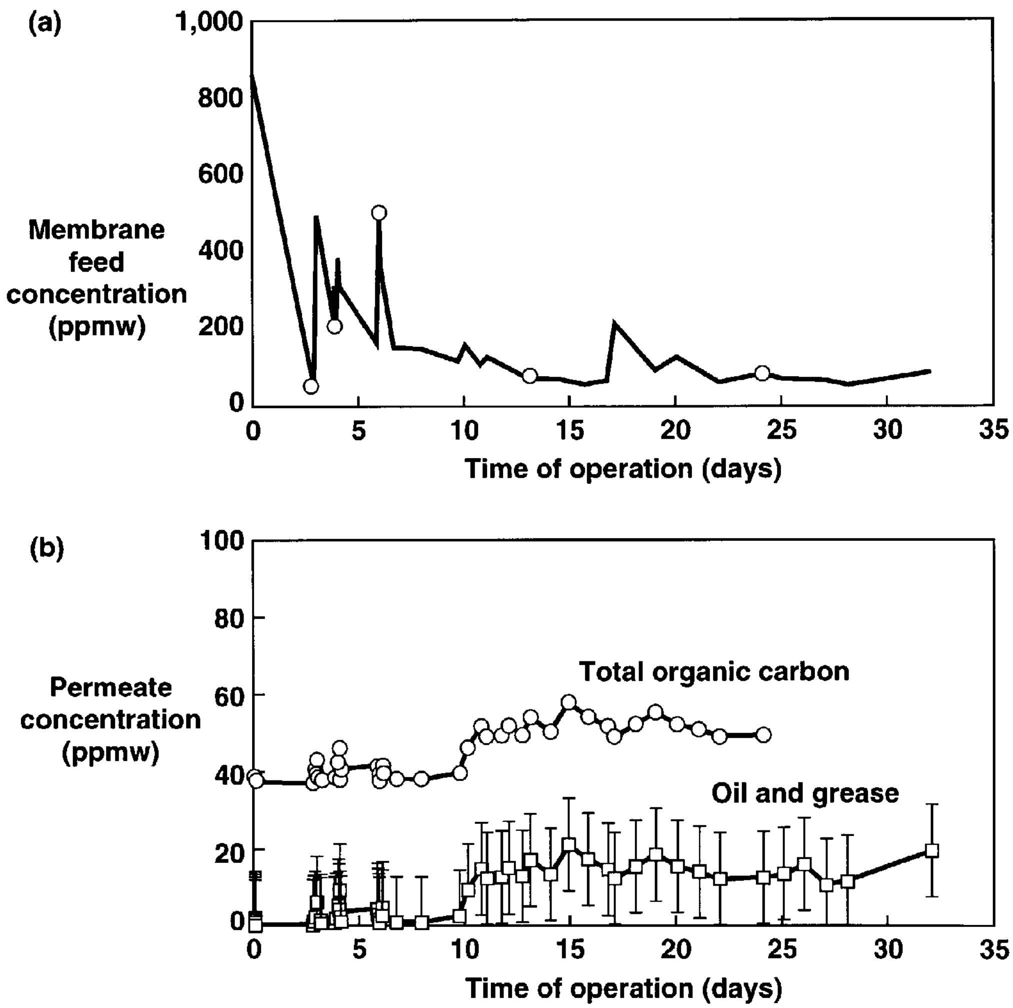
FIG. 9(*a*) is a graph of membrane feed oil concentration over time for the long-term system test.

FIG. 9(*a*) shows the oil concentration of the membrane feed, and FIG. 9(*b*) shows the oil concentration of the membrane permeate, over the month-long test period. As can be seen in FIG. 9(*a*), the concentration of motor oil components in the membrane feed stream was much more variable than the measurements of the centrifuge output concentration shown in FIG. 8.

These fluctuations arose from manual adjustments to the system, in conjunction with changes in feed flow and recirculation rates, and operation of the membrane system overnight while the centrifuge was turned off. Spikes occurred especially during the early days of the experiments, as shown in FIG. 9(*a*), when numerous adjustments to each unit operation were being made.

As can be seen in FIG. 9(*b*), despite these large fluctuations, the concentration of total organic carbon (TOC) in the permeate remained essentially constant at about 50 ppm throughout the test.

As noted above, permeate samples were sent to an independent laboratory for further analysis. The analysis showed that, of the 50±12 ppm total organic carbon content of the permeate, most was surfactant and low-molecular-weight VOCs that had permeated the membrane. The oil or grease content measured by the test was close to or below the 12-ppm detection limit of the measurement equipment in most cases. In particular, for the first ten days of the test, the oil was essentially completely rejected. Thus, the membranes were able to achieve very high rejection, even of dissolved oil.

Example 11

Membrane Ultrafiltration Flux Performance

Figure 10:
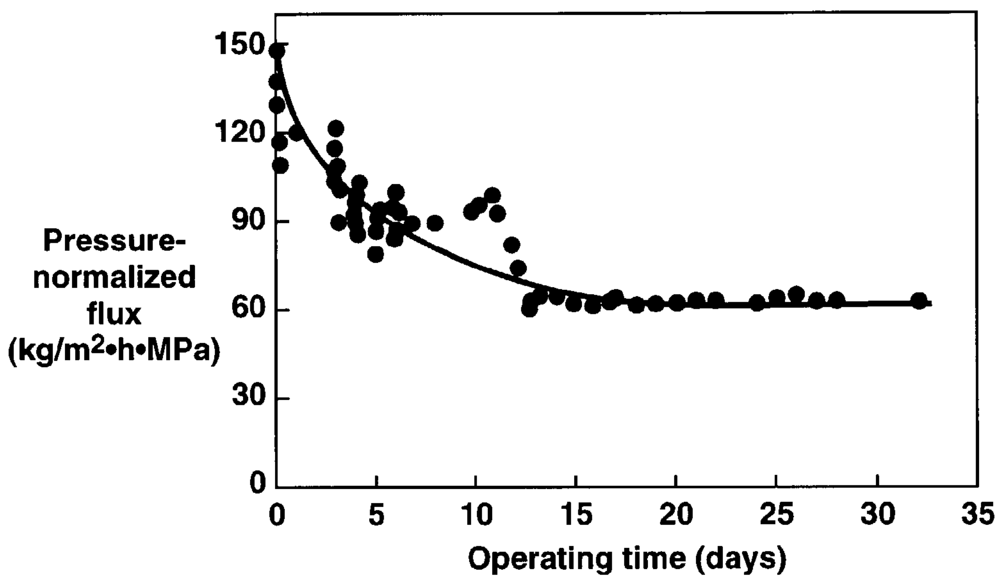
FIG. 10 is a graph showing the pressure-normalized fluxes of a membrane module as a function of operating time.

The water flux of the membrane module was measured before the month-long test began, and several times a day throughout the test period. The initial steady-state flux was around 120 kg/m$^2$h·MPa. The membrane flux declined about 50%, to around 60 kg/m$^2$·h·MPa, by the end of the month-long test, as shown by the data in FIG. 10. This flux decline is less severe than would be encountered with a traditional porous membrane.

Examples 12–16

Computer Modeling Calculations—Fixed Feed Flow

A series of computer calculations was performed with a modeling program, ChemCad V (ChemStations, Inc., Houston, Tex.), to examine the effect of recirculating the membrane residue stream on the membrane separation step. In particular, the goal of the calculations was to examine the effect, in an embodiment such as that of FIG. 12, of changing the split ratio between streams 1210 and 1211.

The calculations were performed by computer modeling the ultrafiltration step only. Thus, account was not taken of the effect on concentration of recirculation of stream 1211 to the centrifugal separation step. However, as shown in Example 9, the oil concentration in the water phase from the centrifuge is largely independent of the oil content of the centrifuge feed. Thus, in all cases, the centrifugal separator was assumed to produce a heavy-phase water stream, 1204, containing 100 ppmw oil, and the volume flow of stream 1204 was simply adjusted for a correct mass balance as the split between streams 1210 and 1211 changed. N-dodecane was used as the model oil. In all cases, the feed flow to the membrane step was assumed to be 1 gpm, and the stage-cut was assumed to be 5%.

Example 12

A calculation was performed assuming residue stream 1209 was split 90/10, that is, 90% was assumed to be recirculated as stream 1210 to the membrane step. The results are shown in Table 4. The stream numbers refer to FIG. 12.

TABLE 4

| | Stream | | | | | | |
|---|---|---|---|---|---|---|---|
| | 1204 | 1206 | 1207 | 1208 | 1209 | 1210 | 1211 |
| Mass flow (kg/h) | 35.6 | 246.0 | 246.0 | 12.3 | 233.8 | 210.4 | 23.4 |
| Temp. (° C.) | 25 | 25 | 25 | 25 | 25 | 25 | 25 |
| Pressure (psia) | 15 | 15 | 45 | 15 | 35 | 35 | 35 |
| Component | | | | | | | |
| n-Dodecane (ppmw) | 100 | 143 | 143 | 5 | 150 | 150 | 150 |
| Water (wt %) | 99.99 | 99.99 | 99.99 | 100.00 | 99.99 | 99.99 | 99.99 |

Membrane area = 1 m$^2$

Example 13

The calculation of Example 12 was repeated, except assuming residue stream 1209 was split 80/20, that is, 80% was assumed to be recirculated as stream 1210 to the membrane step. The results are shown in Table 5. The stream numbers refer to FIG. 12.

TABLE 5

| | Stream | | | | | | |
|---|---|---|---|---|---|---|---|
| | 1204 | 1206 | 1207 | 1208 | 1209 | 1210 | 1211 |
| Mass flow (kg/h) | 59.0 | 245.8 | 245.8 | 12.3 | 233.5 | 186.8 | 46.7 |
| Temp. (° C.) | 25 | 25 | 25 | 25 | 25 | 25 | 25 |
| Pressure (psia) | 15 | 15 | 45 | 15 | 35 | 35 | 35 |
| Component | | | | | | | |
| n-Dodecane (ppmw) | 100 | 119 | 119 | 4 | 125 | 125 | 125 |
| Water (wt %) | 99.99 | 99.99 | 99.99 | 100.00 | 99.99 | 99.99 | 99.99 |

Membrane area = 1 $m^2$

Example 14

The calculation of Example 13 was repeated, except assuming residue stream 1209 was split 50/50, that is, 50% was assumed to be recirculated as stream 1210 to the membrane step. The results are shown in Table 6. The stream numbers refer to FIG. 12.

TABLE 6

| | Stream | | | | | | |
|---|---|---|---|---|---|---|---|
| | 1204 | 1206 | 1207 | 1208 | 1209 | 1210 | 1211 |
| Mass flow (kg/h) | 129.0 | 245.7 | 245.7 | 12.3 | 233.4 | 116.7 | 116.7 |
| Temp. (° C.) | 25 | 25 | 25 | 25 | 25 | 25 | 25 |
| Pressure (psia) | 15 | 15 | 45 | 15 | 35 | 35 | 35 |
| Component | | | | | | | |
| n-Dodecane (ppmw) | 100 | 105 | 105 | 3 | 110 | 110 | 110 |
| Water (wt %) | 99.99 | 99.99 | 99.99 | 100.00 | 99.99 | 99.99 | 99.99 |

Membrane area = 1 $m^2$

Example 15

The calculation of Example 13 was repeated, except assuming residue stream 1209 was split 10/90, that is, 10% was assumed to be recirculated as stream 1210 to the membrane step. The results are shown in Table 7. The stream numbers refer to FIG. 12.

TABLE 7

| | Stream | | | | | | |
|---|---|---|---|---|---|---|---|
| | 1204 | 1206 | 1207 | 1208 | 1209 | 1210 | 1211 |
| Mass flow (kg/h) | 222.0 | 245.3 | 245.3 | 12.3 | 233.0 | 23.3 | 209.7 |
| Temp. (° C.) | 25 | 25 | 25 | 25 | 25 | 25 | 25 |
| Pressure (psia) | 15 | 15 | 45 | 15 | 35 | 35 | 35 |
| Component | | | | | | | |
| n-Dodecane (ppmw) | 100 | 101 | 101 | 3 | 106 | 106 | 106 |
| Water (wt %) | 99.99 | 99.99 | 99.99 | 100.00 | 99.99 | 99.99 | 99.99 |

Membrane area = 1 $m^2$

Example 16

The results of Examples 12–15 are summarized in Table 8.

TABLE 8

| Split Ratio Recirculate/Remove | | n-Dodecane Concentration (ppmw) | | | |
|---|---|---|---|---|---|
| Stream 1210 | Stream 1211 | Stream 1204 | Stream 1210 | Stream 1207 | Stream 1208 |
| 90 | 10 | 100 | 150 | 143 | 5 |
| 80 | 20 | 100 | 125 | 119 | 4 |
| 50 | 50 | 100 | 110 | 105 | 3 |
| 10 | 90 | 100 | 106 | 101 | 3 |

As can be seen, even when a very large portion of the residue is recirculated directly to the membrane step, the membrane permeate, stream 1208, still meets the specification of less than 15 ppmw oil.

Examples 17–20

Computer Modeling Calculations—Variable Membrane Feed Flow

A series of calculations similar to those of Examples 12–16 was performed for varying split ratios. The membrane area was held the same in all calculations, as in the previous examples, but the flow rate of stream 1204 was not adjusted with varying split ratio. Thus, the effect of changing the split ratio was to change the flow rate to the membrane of stream 1207, and hence the stage-cut.

Example 17

A calculation was performed assuming residue stream 1209 to be split 80/20, that is, 80% was assumed to be recirculated as stream 1210 to the membrane step. This resulted in a membrane feed flow rate of 0.6 gpm and a membrane stage-cut of about 10%. The results are shown in Table 9. The stream numbers refer to FIG. 12.

TABLE 9

| | Stream | | | | | | |
|---|---|---|---|---|---|---|---|
| | 1204 | 1206 | 1207 | 1208 | 1209 | 1210 | 1211 |
| Mass flow (kg/h) | 35.6 | 129.1 | 129.1 | 12.3 | 116.9 | 93.5 | 23.4 |
| Temp. (° C.) | 25 | 25 | 25 | 25 | 25 | 25 | 25 |
| Pressure (psia) | 15 | 15 | 45 | 15 | 35 | 35 | 35 |
| Component | | | | | | | |
| n-Dodecane (ppmw) | 100 | 136 | 136 | 5 | 150 | 150 | 150 |
| Water (wt %) | 99.99 | 99.99 | 99.99 | 100.00 | 99.99 | 99.99 | 99.99 |

Membrane area = 1 $m^2$

Example 18

The calculation of Example 17 was repeated, except that residue stream 1209 was assumed to be split 50/50, that is, 50% was assumed to be recirculated as stream 1210 to the membrane step. This resulted in a reduction of feed flow to the membrane to 0.3 gpm and an increase in stage-cut to about 21%. The results are shown in Table 10, where stream numbers refer to FIG. 12.

TABLE 10

| | Stream | | | | | | |
|---|---|---|---|---|---|---|---|
| | 1204 | 1206 | 1207 | 1208 | 1209 | 1210 | 1211 |
| Mass flow (kg/h) | 35.6 | 59.0 | 59.0 | 12.3 | 46.7 | 23.4 | 23.4 |
| Temp. (° C.) | 25 | 25 | 25 | 25 | 25 | 25 | 25 |
| Pressure (psia) | 15 | 15 | 45 | 15 | 35 | 35 | 35 |
| Component | | | | | | | |
| n-Dodecane (ppmw) | 100 | 120 | 120 | 4 | 150 | 150 | 150 |
| Water (wt %) | 99.99 | 99.99 | 99.99 | 100.00 | 99.99 | 99.99 | 99.99 |

Membrane area = 1 $m^2$

Example 19

The calculation of Example 17 was repeated, except that residue stream 1209 was assumed to be split 10/90, that is, 10% was assumed to be recirculated as stream 1210 to the membrane step. This resulted in a reduction of feed flow to the membrane to 0.2 gpm and an increase in stage-cut to about 32%. The results are shown in Table 11. The stream numbers refer to FIG. 12.

TABLE 11

| | Stream | | | | | | |
|---|---|---|---|---|---|---|---|
| | 1204 | 1206 | 1207 | 1208 | 1209 | 1210 | 1211 |
| Mass flow (kg/h) | 35.6 | 38.2 | 38.2 | 12.3 | 25.9 | 2.6 | 23.4 |
| Temp. (° C.) | 25 | 25 | 25 | 25 | 25 | 25 | 25 |
| Pressure (psia) | 15 | 15 | 45 | 15 | 35 | 35 | 35 |
| Component | | | | | | | |
| n-Dodecane (ppmw) | 100 | 103 | 103 | 4 | 150 | 150 | 150 |
| Water (wt %) | 99.99 | 99.99 | 99.99 | 100.00 | 99.99 | 99.99 | 99.99 |

Membrane area = 1 $m^2$

Example 20

The results of Examples 17–19 are summarized in Table 12.

TABLE 12

| | | Split Ratio Recirculate/Remove | | n-Dodecane Concentration (ppmw) | | | |
|---|---|---|---|---|---|---|---|
| Feed Flow Rate (gpm) | Stage-Cut (%) | Stream 1210 | Stream 1211 | Stream 1204 | Stream 1210 | Stream 1207 | Stream 1208 |
| 0.6 | 10 | 80 | 20 | 100 | 150 | 136 | 5 |
| 0.3 | 21 | 50 | 50 | 100 | 150 | 120 | 4 |
| 0.2 | 32 | 10 | 90 | 100 | 150 | 103 | 4 |

As can be seen, the less material is recirculated in the membrane loop, the lower is the oil concentration in the membrane permeate stream. However, as with examples 12–16, even high flows of water recirculation, resulting in substantial increase in oil content in the loop, can be handled by the membrane separation step to yield a permeate stream of extremely low oil concentration.

Examples 21–22

Computer Modeling Calculations—Variable Membrane Stage-Cut

Two computer modeling calculations were performed based on the process design of FIG. 2, and assuming that all of the membrane residue stream 210/212 was recirculated as stream 214 to the centrifugal separator. The flow rate of wastewater to be treated, stream 201, was assumed to be 10 gpm, and the feed was assumed to be 2 wt % motor oil in water.

Example 21

The membrane stage-cut for this calculation was assumed to be 50%. The results are shown in Table 13. The stream numbers refer to FIG. 2.

TABLE 13

| Stream | 201 | 202 | 207 | 210 | 211 |
|---|---|---|---|---|---|
| Volume flow (gpm) | 10.0 | 19.8 | 19.6 | 9.8 | 9.8 |
| Temp. (° C.) | 25 | 25 | 25 | 25 | 25 |

TABLE 13-continued

| Stream | 201 | 202 | 207 | 210 | 211 |
|---|---|---|---|---|---|
| Pressure (psia) | 15 | 15 | 150 | 150 | 15 |
| Component (wt %): | | | | | |
| Motor oil | 2.0 | 1.0 | 100 ppm | 200 ppm | 1.5 ppm |
| Water | 98.0 | 99.0 | 99.99 | 99.98 | 100.00 |

Membrane area = 24 $m^2$

Example 22

The calculation of Example 21 was repeated, except assuming a 90% stage-cut. All other parameters were assumed to be as in Example 21. The results are shown in Table 14. The stream numbers refer to FIG. 2.

TABLE 14

| Stream | 201 | 202 | 207 | 210 | 211 |
|---|---|---|---|---|---|
| Volume flow (gpm) | 10.0 | 11.1 | 10.9 | 1.1 | 9.8 |
| Temp. (° C.) | 25 | 25 | 25 | 25 | 25 |
| Pressure (psia) | 15 | 15 | 150 | 150 | 15 |
| Component (wt %): | | | | | |
| Motor oil | 2.0 | 1.8 | 100 ppm | 0.1 | 6 ppm |
| Water | 98.0 | 98.2 | 99.99 | 99.9 | 100.00 |

Membrane area = 24 $m^2$

Comparing Tables 13 and 14, it can be seen that lower stage-cut in the membrane separation step results in more recycle to the centrifugal separation step, dilutes the concentration of the centrifuge feed stream, 202, and requires much higher centrifuge capacity (19.8 gpm versus 11.1 gpm). On the other hand, lower stage-cut provides a cleaner permeate from the membrane separation step (1.5 ppmw oil versus 6 ppmw oil). In a real system, the centrifuge capacity requirements could be controlled and the stage-cut kept low by splitting the recirculating material between streams 213 and 214.

Example 23

A calculation was performed assuming the same feed as that of Examples 21 and 22, that is 10 gpm of oily wastewater containing 2 wt % motor oil, but in this case splitting the recirculated membrane residue stream to return a portion to the centrifugal separation step and a portion to the first membrane separation step.

The process was assumed to be carried out according to the embodiment of FIG. 3, using the same types of membranes in both membrane separation steps. The stage-cut of membrane unit 309 was assumed to be 50%; the stage-cut of membrane unit 313 was assumed to be 90%, that is, a 90/10 split between the streams recirculated to the membrane separation step and the centrifugal separation step. The results are shown in Table 15. The stream numbers refer to FIG. 3.

TABLE 15

| Stream | 301 | 316 | 302 | 304 | 315 | 308 | 311 | 312 |
|---|---|---|---|---|---|---|---|---|
| Mass flow (gpm) | 10.0 | 1.0 | 11.0 | 10.8 | 8.8 | 19.6 | 9.8 | 9.8 |
| Temp. (° C.) | 25 | 25 | 25 | 25 | 25 | 25 | 25 | 25 |
| Pressure (psia) | 15 | 150 | 15 | 15 | 15 | 150 | 150 | 15 |
| Component (wt %): | | | | | | | | |
| n-Dodecane | 2.0 | 0.1 | 1.8 | 100 ppm | 6 ppm | 58 ppm | 108 ppm | 0.8 ppm |
| Water | 98.0 | 99.9 | 98.2 | 99.99 | 100.0 | 99.99 | 99.99 | 100.00 |

Membrane area = 24 $m^2$ + 22 $m^2$ = 46 $m^2$

Comparing Table 15 with Tables 13 and 14, it can be seen that the process configuration of FIG. 3 requires less centrifuge capacity but more membrane area, and produces a cleaner permeate water stream.

Examples 24–25
Computer Modeling Calculations—Variable Membrane Stage-Cut

Example 24

Two calculations were performed assuming the same feed as that of Examples 21–23, that is 10 gpm of oily wastewater containing 2 wt % motor oil, but in this case assuming a process configuration as in FIG. 2 with a 90/10 split; that is, 90% of stream 210/212 was assumed to be recirculated as stream 213 to the membrane step, and the remaining 10% was assumed to be recirculated as stream 214 to the centrifugal separator. The membrane stage-cut was assumed to be 50%. The results are shown in Table 16. The stream numbers refer to FIG. 2.

TABLE 16

| Stream | 201 | 214 | 202 | 204 | 213 | 207 | 210 | 211 |
|---|---|---|---|---|---|---|---|---|
| Mass flow (gpm) | 10.0 | 1.0 | 11.0 | 10.8 | 8.8 | 19.6 | 9.8 | 9.8 |
| Temp. (° C.) | 25 | 25 | 25 | 25 | 25 | 25 | 25 | 25 |

TABLE 16-continued

| Stream | 201 | 214 | 202 | 204 | 213 | 207 | 210 | 211 |
|---|---|---|---|---|---|---|---|---|
| Pressure (psia) | 15 | 35 | 15 | 15 | 35 | 35 | 35 | 15 |
| Component (wt %): | | | | | | | | |
| Motor oil | 2.0 | 0.1 | 1.8 | 100 ppm | 0.1 | 540 ppm | 0.1 | 9 ppm |
| Water | 98.0 | 99.9 | 98.2 | 99.99 | 99.9 | 99.9 | 99.9 | 100.0 |

Membrane area = 100 $m^2$

Example 25

The calculation of Example 24 was repeated, except assuming a 10% membrane stage-cut. All other parameters were assumed to be as in Example 24. The results are shown in Table 17. The stream numbers refer to FIG. 2.

TABLE 17

| Stream | 201 | 214 | 202 | 204 | 213 | 207 | 210 | 211 |
|---|---|---|---|---|---|---|---|---|
| Mass flow (gpm) | 10.0 | 8.2 | 18.2 | 18.0 | 80.0 | 98.0 | 88.2 | 9.8 |
| Temp. (° C.) | 25 | 25 | 25 | 25 | 25 | 25 | 25 | 25 |
| Pressure (psia) | 15 | 35 | 15 | 15 | 35 | 35 | 35 | 15 |
| Component (wt %): | | | | | | | | |
| Motor oil | 2.0 | 198 ppm | 1.2 | 100 ppm | 198 ppm | 180 ppm | 198 ppm | 2 ppm |
| Water | 98.0 | 99.98 | 98.2 | 99.99 | 99.98 | 99.98 | 99.98 | 100.00 |

Membrane area =100 $m^2$

As can be seen, the lower stage-cut again provides a better quality permeate stream, but retains a much larger volume in the membrane residue stream, thereby increasing the required capacity for the centrifugal separation step.

We claim:

1. A process for treating oily wastewater generated on a ship, comprising:

(a) carrying out a centrifugal separation step, comprising:

(i) providing a centrifugal separator;

(ii) treating the oily wastewater in the centrifugal separator, thereby dividing the oily wastewater into a light oil-rich phase and a heavy oil-depleted phase;

(iii) withdrawing the light oil-rich phase as a concentrate stream;

(iv) withdrawing the heavy oil-depleted phase as a water stream;

(b) carrying out a membrane separation step, comprising:

(i) providing a membrane separation unit containing a membrane having a feed side and a permeate side, the membrane being characterized in that the feed side comprises a dense, non-porous membrane capable of permeating water and rejecting both emulsified oil and dissolved oil under ultrafiltration conditions;

(ii) passing the water stream across the feed side;

(iii) withdrawing from the feed side a residue stream enriched in oil compared to the water stream;

(iv) withdrawing from the permeate side a treated water permeate stream.

2. The process of claim 1, wherein the centrifugal separator is a centrifuge.

3. The process of claim 1, wherein the centrifugal separation step is performed under a G-force of no more than about 2,000 G.

4. The process of claim 1, wherein the centrifugal separation step is performed under a G-force of no more than about 1,000 G.

5. The process of claim 1, wherein the centrifugal separator provides a turn-down ratio of at least about 5.

6. The process of claim 1, wherein the centrifugal separator provides a turn-down ratio of at least about 10.

7. The process of claim 1, wherein the concentrate stream is subjected to further treatment.

8. The process of claim 1, wherein the concentrate stream is incinerated.

9. The process of claim 1, wherein the water stream is pressurized to a pressure no more than about 600 psia before step (b) (ii).

10. The process of claim 1, wherein the water stream is pressurized to a pressure no more than about 150 psia before step (b) (ii).

11. The process of claim 1, wherein the dense, non-porous membrane is a hydrophilic membrane.

12. The process of claim 1, wherein the dense, non-porous membrane comprises a polymer selected from the group consisting of cellulose derivatives, ether-based polyurethanes, ester-based polyurethanes, block copolymers containing polyether blocks, and polyvinyl alcohol.

13. The process of claim 1, wherein the dense, non-porous membrane comprises a polyamide-polyether block copolymer.

14. The process of claim 1, wherein the membrane separation step is carried out at a stage-cut of no more than about 50%.

15. The process of claim 1, wherein the membrane separation step is carried out at a stage-cut of no more than about 30%.

16. The process of claim 1, wherein the treated water permeate stream contains less than about 100 ppm oil.

17. The process of claim 1, wherein the treated water permeate stream contains less than about 20 ppm oil.

18. The process of claim 1, wherein the treated water permeate stream contains less than about 10 ppm oil.

19. The process of claim 1, wherein the treated water permeate stream contains less than about 1 ppm oil.

20. The process of claim 1, wherein the dense, non-porous membrane exhibits a water flux of at least about 50 $kg/m^2.h$.

21. The process of claim 1, wherein the dense, non-porous membrane exhibits a water flux of at least about 100 $kg/m^2.h$.

22. The process of claim 1, wherein the treated water permeate stream is subjected to further treatment.

23. The process of claim 1, wherein at least a portion of the residue stream is recirculated to the centrifugal separation step.

24. The process of claim 1, wherein at least a portion of the residue stream is recirculated to the membrane separation step.

25. The process of claim 1, wherein a first portion of the residue stream is recirculated to the membrane separation step, a second portion of the residue stream is recirculated to the centrifugal separation step and the first portion and the second portion are in a ratio (first portion):(second portion) between about 20:80 and 80:20.

26. The process of claim 1, wherein a first portion of the residue stream is recirculated to the membrane separation step, a second portion of the residue stream is recirculated to the centrifugal separation step and the first portion and the second portion are in a ratio (first portion):(second portion) of less than about 50:50.

27. The process of claim 1, wherein a first portion of the residue stream is recirculated to the membrane separation step, a second portion of the residue stream is recirculated to the centrifugal separation step and the first portion and the second portion are in a ratio (first portion):(second portion) of more than about 50:50.

28. The process of claim 1, wherein a first portion of the residue stream is recirculated to the membrane separation step, a second portion of the residue stream is recirculated to the centrifugal separation step and the first portion and the second portion are separated from the residue stream selectively so as to preferentially recirculate water to the membrane separation step and oil to the centrifugal separation step.

29. The process of claim 1, further comprising:

(c) carrying out a second membrane separation step, comprising:

(i) providing a second membrane separation unit containing a second membrane having a second feed side and a second permeate side, the second membrane being capable of permeating water and rejecting oil;

(ii) passing the residue stream across the second feed side;

(iii) withdrawing from the second feed side a second residue stream enriched in oil compared to the residue stream;

(iv) recirculating at least a portion of the second residue stream to the centrifugal separation step;

(v) withdrawing from the second permeate side a second permeate stream;

(vi) recirculating at least a portion of the second permeate stream to the membrane separation step.

30. The process of claim 29, wherein the second membrane is a dense, non-porous membrane.

31. The process of claim 1, wherein a tank is positioned in liquid-transferring relationship between the centrifugal separator and the membrane separation unit, so that the water stream enters the tank before being passed to the membrane separation unit.

32. The process of claim 1, wherein the oily wastewater is subjected to a pretreatment step before being passed to the centrifugal separation step.

33. The process of claim 32, wherein the pretreatment step is a filtration step.

34. The process of claim 32, wherein the pretreatment step is a gravity-driven separation step.

35. The process of claim 1, carried out on board a ship.

36. The process of claim 35, wherein the treated water permeate stream is discharged from the ship.

37. The process of claim 1, further comprising determining a target oil concentration for the treated water permeate stream and monitoring the treated water permeate stream for the presence of an amount of oil exceeding the target oil concentration.

* * * * *